United States Patent
Du et al.

(10) Patent No.: US 12,231,682 B2
(45) Date of Patent: *Feb. 18, 2025

(54) FILTER OFFSET VALUE MAPPING

(71) Applicant: TENCENT AMERICA LLC, Palo Alto, CA (US)

(72) Inventors: Yixin Du, Los Altos, CA (US); Xin Zhao, Santa Clara, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/189,001

(22) Filed: Mar. 23, 2023

(65) Prior Publication Data

US 2023/0232041 A1 Jul. 20, 2023

Related U.S. Application Data

(63) Continuation of application No. 17/360,840, filed on Jun. 28, 2021, now Pat. No. 11,689,743.

(Continued)

(51) Int. Cl.
*H04N 19/186* (2014.01)
*H04N 19/176* (2014.01)
(Continued)

(52) U.S. Cl.
CPC ......... *H04N 19/593* (2014.11); *H04N 19/176* (2014.11); *H04N 19/186* (2014.11); *H04N 19/82* (2014.11)

(58) Field of Classification Search
CPC .. H04N 19/117; H04N 19/176; H04N 19/186; H04N 19/593; H04N 19/82
See application file for complete search history.

(56) References Cited

U.S. PATENT DOCUMENTS

2009/0003690 A1  1/2009 Jiao et al.
2013/0336383 A1 12/2013 Xu et al.
(Continued)

FOREIGN PATENT DOCUMENTS

| CN | 115989675 A | 4/2023 |
| WO | 2020182620 A1 | 9/2020 |
| WO | 2022046903 A1 | 3/2022 |

OTHER PUBLICATIONS

Extended European Search Report in EP21892499.1, mailed Apr. 3, 2023, 7 pages.

(Continued)

*Primary Examiner* — Md N Haque
(74) *Attorney, Agent, or Firm* — Morgan, Lewis & Bockius LLP

(57) ABSTRACT

A method of video decoding includes decoding prediction information of a current block indicating a subset of combinations of processed reconstructed samples of a first component and corresponding offset values of a filter process to be applied to a second color component, and determining an offset value of the filter process to apply to reconstructed samples of the second color component based on a combination of processed reconstructed samples of the first component. The determined offset value is based on whether the combination of the processed reconstructed samples of the first color component corresponds to or is different from the combinations of the processed reconstructed samples.

21 Claims, 29 Drawing Sheets

Related U.S. Application Data

(60) Provisional application No. 63/113,120, filed on Nov. 12, 2020.

(51) Int. Cl.
  *H04N 19/593* (2014.01)
  *H04N 19/82* (2014.01)

(56) References Cited

U.S. PATENT DOCUMENTS

| | | | | |
|---|---|---|---|---|
| 2015/0016512 A1* | 1/2015 | Pu | ............... | H04N 19/186 |
| | | | | 375/240.03 |
| 2015/0341673 A1* | 11/2015 | Joshi | ............... | H04N 19/182 |
| | | | | 375/240.12 |
| 2015/0373349 A1* | 12/2015 | Zhang | ............... | H04N 19/14 |
| | | | | 375/240.02 |
| 2016/0261884 A1* | 9/2016 | Li | ............... | H04N 19/82 |
| 2021/0014481 A1* | 1/2021 | Ichigaya | ............... | H04N 19/52 |
| 2021/0014527 A1* | 1/2021 | Iwamura | ............... | H04N 19/137 |
| 2021/0105506 A1* | 4/2021 | Misra | ............... | H04N 19/186 |

OTHER PUBLICATIONS

Bross et al., "Versatile Video Coding (Draft 6)," Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O2001-vE, 321 pages.

Bross et al., "Versatile Video Coding (Draft 7)," Joint Video Experts Team (JVET) of ITU-T SG 16 WP 3 and ISO/IEC JTC 1/SC 29/WG 11, 16th Meeting: Geneva, CH, Oct. 1-11, 2019, Document: JVET-P2001-vE, 488 pages.

Daede et al., "Daala: A Perceptually-Driven Next Generation Video Codec," arXiv:1603.03129, Mar. 10, 2016, 10 pages.

International Search Report in PCT/US2021/039600, mailed Oct. 6, 2021, 2 pages.

Midtskogen et al., "The AV1 Constrained Directional Enhancement Filter (CDEF)," 2018 IEEE International Conference on Acoustics, Speech and Signal Processing (ICASSP), 2018, 5 pages.

Misra et al., "CE5-related: On the design of CC-ALF," Joint Video Experts Team (JVET) of ITU-T SG 16 WP 3 and ISO/IEC JTC 1/SC 29/WG 11, 16th Meeting: Geneva, CH, Oct. 1-11, 2019, Document: JVET-P1008-v2, 6 pages.

Misra et al., "Cross-Component Adaptive Loop Filter for chroma," Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O0636_r1, 9 pages.

Mukherjee et al., "A Switchable Loop-Restoration With Side-Information Framework for the Emerging AV1 Video Codec," 2017 IEEE International Conference on Image Processing (ICIP), 2017, pp. 265-269.

Taquet et al., "CE5: Results of tests CE5-3.1 to CE5-3.4 on Non-Linear Adaptive Loop Filter.," Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N0242, 10 pages.

Tsai et al., "TE10 Subtest2: Coding Unit Synchronous Picture Quadtree-based Adaptive Loop Filter," Joint Collaborative Team on Video Coding (JCT-VC) of ITU-T SG16 WP3 and ISO/IEC JTC1/SC29/WG11, 3rd Meeting: Oct. 7-15, 2010, Document: JCTVC-C143, 12 pages.

Madhukar Bhat et al., "AHG10: Adaptive Coding Sub-Set for Encoder Optimization" Document: JVET-O0888, Joint Video Experts Team (JVET) of ITU-T SG 16 WP 3 and ISO/IEC JTC 1/SC 29/WG 11, 15$^{th}$ Meeting: Gothenburg, SE, Jul. 3-12, 2019, 7 pgs.

Tencent America LLC, European Office Action, EP Patent Application No. 21892499.1, Dec. 4, 2024, 9 pgs.

C. W. Kuo et al., "AHG12: Cross-component Sample Adaptive Offset" Document: JVET-V0153, Joint Video Experts Team (JVET) of ITU-T SG 16 WP 3 and ISO/IEC JTC 1/SC 29, 22nd Meeting, by teleconference, Apr. 20-28, 2021, 4 pgs.

\* cited by examiner

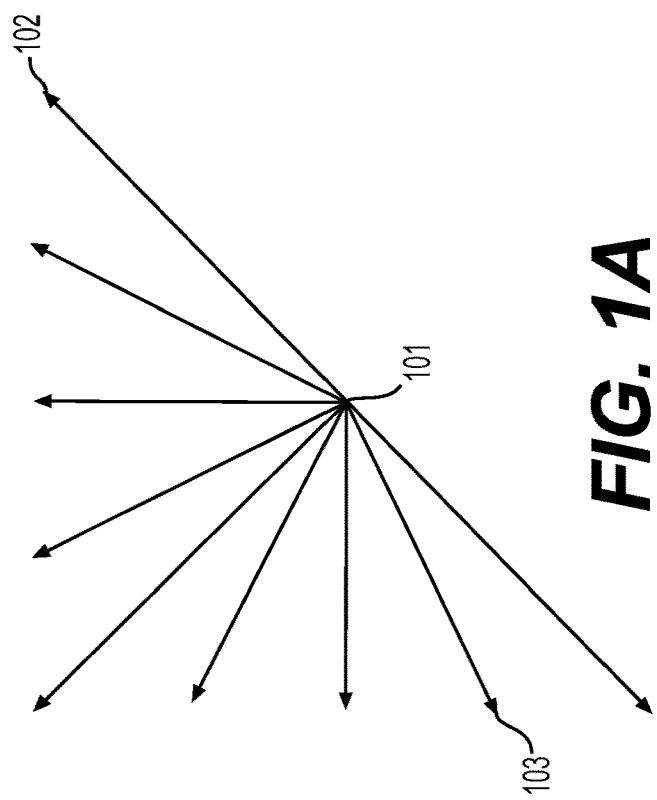
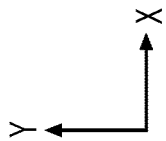
FIG. 1A

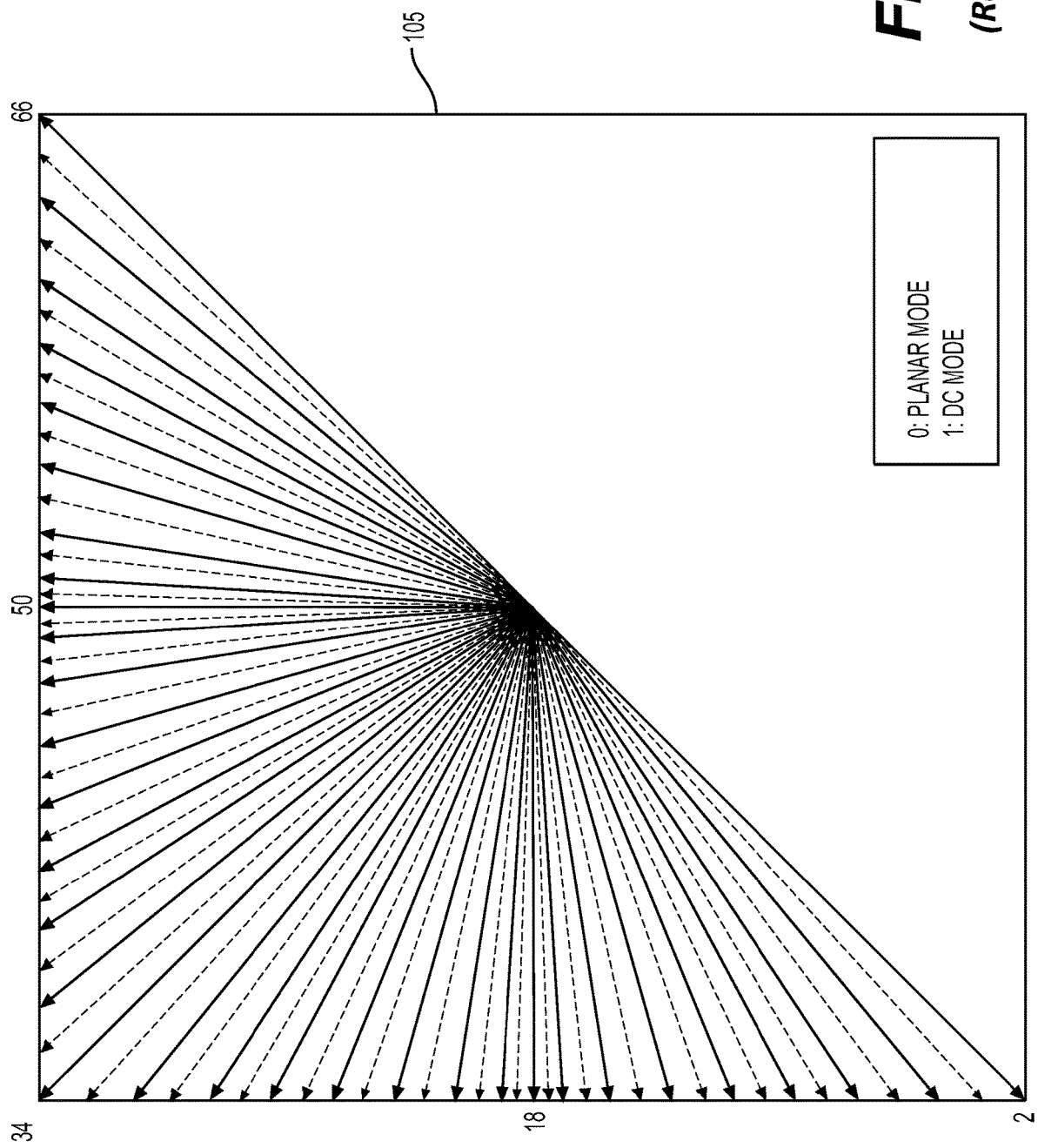
FIG. 1B *(Related Art)*

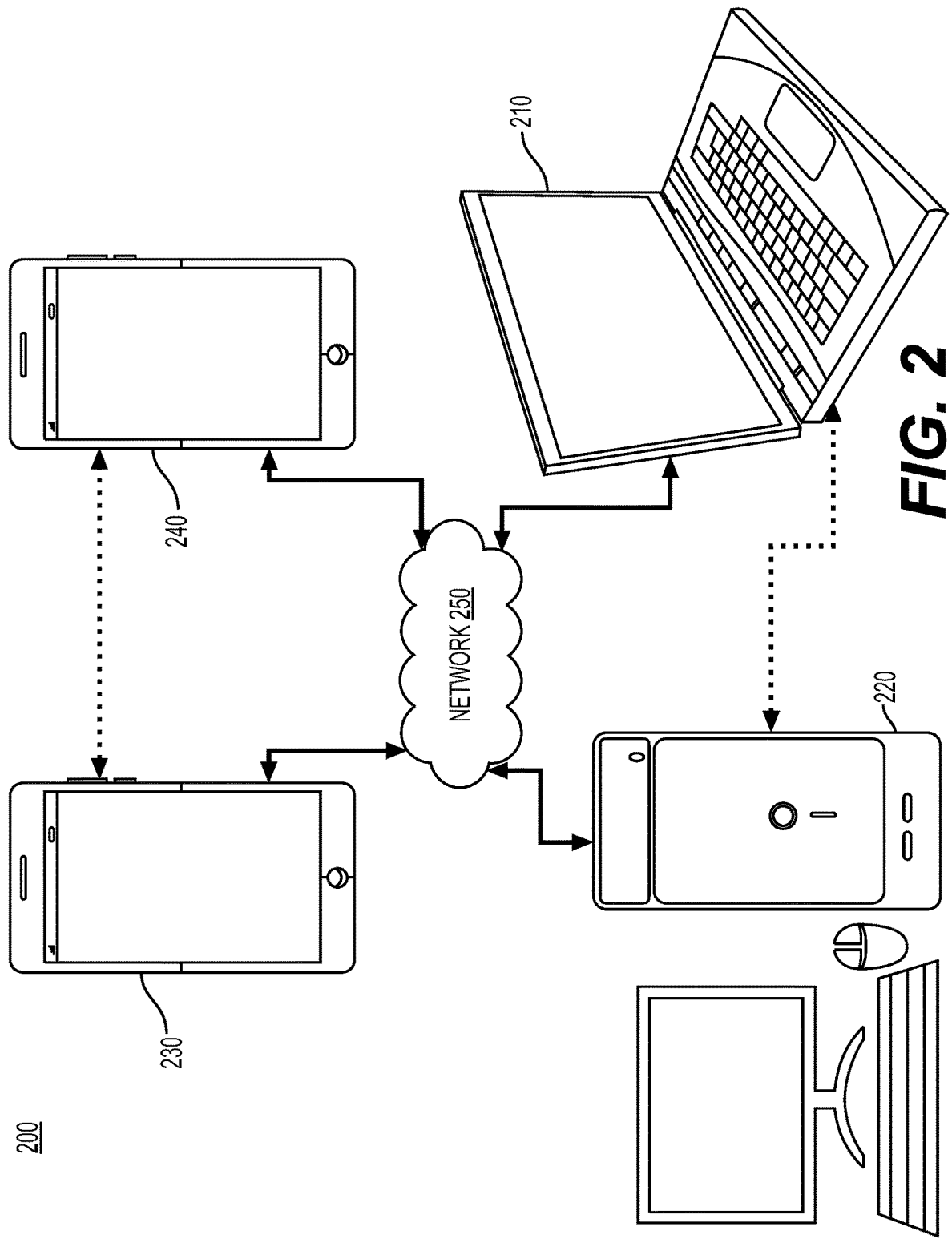

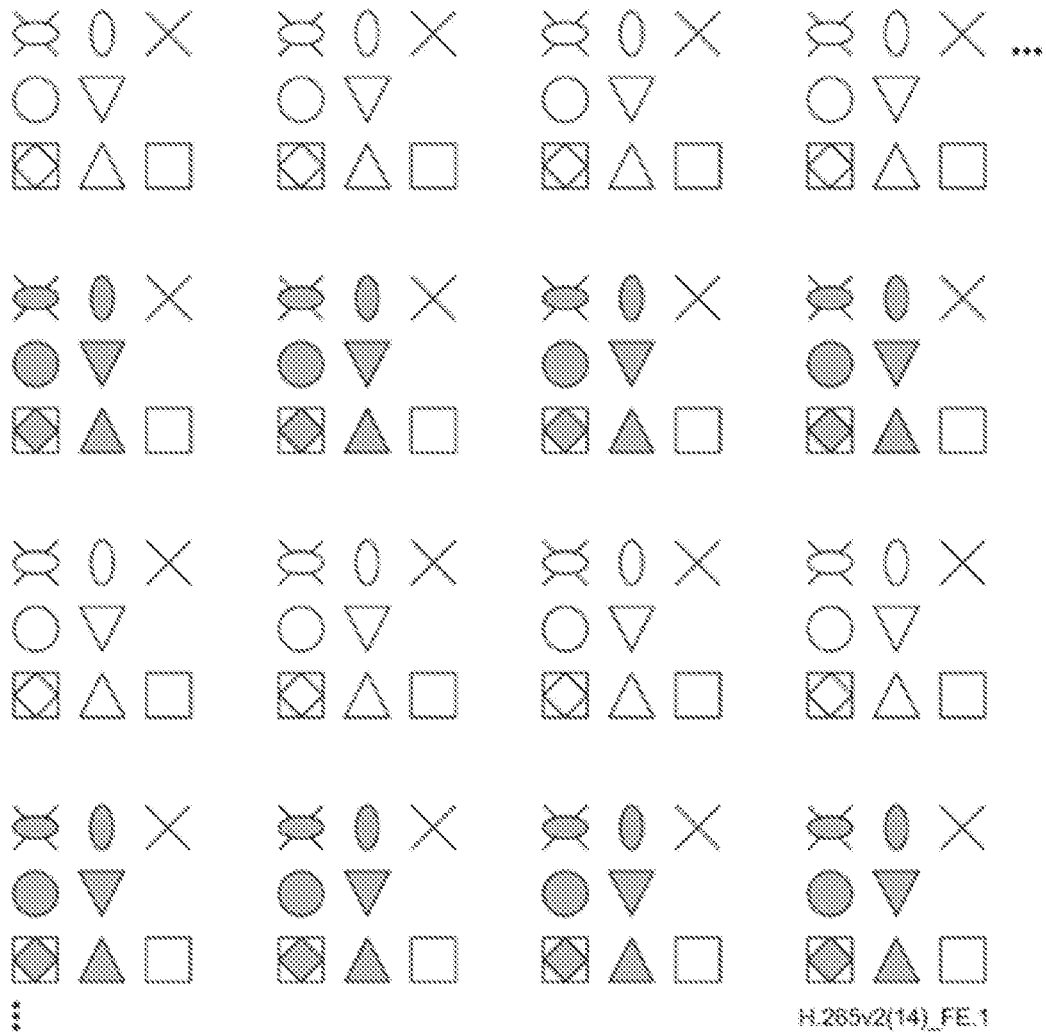

Interpretation of symbols
Luma sample position indications:

✕ Luma sample top field     ☐ Luma sample bottom field

Chroma sample position indications, where gray fill indicates a bottom field sample type and no fill indicates a top field sample type:

 Chroma sample type 2      Chroma sample type 3

 Chroma sample type 0      Chroma sample type 1

 Chroma sample type 4      Chroma sample type 5

FIG. 15

| Combination | d0 | d1 | d2 | d3 | Offset |
|---|---|---|---|---|---|
| 0 | -1 | -1 | -1 | -1 | s0 |
| 1 | -1 | -1 | -1 | 0 | s1 |
| 2 | -1 | -1 | -1 | 1 | s2 |
| 3 | -1 | -1 | 0 | -1 | s3 |
| 4 | -1 | -1 | 0 | 0 | s4 |
| 5 | -1 | -1 | 0 | 1 | s5 |
| 6 | -1 | -1 | 1 | -1 | s6 |
| 7 | -1 | -1 | 1 | 0 | s7 |
| 8 | -1 | -1 | 1 | 1 | s8 |
| 9 | -1 | 0 | -1 | -1 | s9 |
| 10 | -1 | 0 | -1 | 0 | s10 |
| 11 | -1 | 0 | -1 | 1 | s11 |
| 12 | -1 | 0 | 0 | -1 | s12 |
| 13 | -1 | 0 | 0 | 0 | s13 |
| 14 | -1 | 0 | 0 | 1 | s14 |
| 15 | -1 | 0 | 1 | -1 | s15 |
| 16 | -1 | 0 | 1 | 0 | s16 |
| 17 | -1 | 0 | 1 | 1 | s17 |
| 18 | -1 | 1 | -1 | -1 | s18 |
| 19 | -1 | 1 | -1 | 0 | s19 |
| 20 | -1 | 1 | -1 | 1 | s20 |
| 21 | -1 | 1 | 0 | -1 | s21 |
| 22 | -1 | 1 | 0 | 0 | s22 |
| 23 | -1 | 1 | 0 | 1 | s23 |
| 24 | -1 | 1 | 1 | -1 | s24 |
| 25 | -1 | 1 | 1 | 0 | s25 |
| 26 | -1 | 1 | 1 | 1 | s26 |
| 27 | 0 | -1 | -1 | -1 | s27 |
| 28 | 0 | -1 | -1 | 0 | s28 |
| 29 | 0 | -1 | -1 | 1 | s29 |
| 30 | 0 | -1 | 0 | -1 | s30 |
| 31 | 0 | -1 | 0 | 0 | s31 |
| 32 | 0 | -1 | 0 | 1 | s32 |
| 33 | 0 | -1 | 1 | -1 | s33 |
| 34 | 0 | -1 | 1 | 0 | s34 |
| 35 | 0 | -1 | 1 | 1 | s35 |
| 36 | 0 | 0 | -1 | -1 | s36 |
| 37 | 0 | 0 | -1 | 0 | s37 |
| 38 | 0 | 0 | -1 | 1 | s38 |
| 39 | 0 | 0 | 0 | -1 | s39 |
| 40 | 0 | 0 | 0 | 0 | s40 |

FIG. 19A

| | | | | | |
|---|---|---|---|---|---|
| 41 | 0 | 0 | 0 | 1 | s41 |
| 42 | 0 | 0 | 1 | -1 | s42 |
| 43 | 0 | 0 | 1 | 0 | s43 |
| 44 | 0 | 0 | 1 | 1 | s44 |
| 45 | 0 | 1 | -1 | -1 | s45 |
| 46 | 0 | 1 | -1 | 0 | s46 |
| 47 | 0 | 1 | -1 | 1 | s47 |
| 48 | 0 | 1 | 0 | -1 | s48 |
| 49 | 0 | 1 | 0 | 0 | s49 |
| 50 | 0 | 1 | 0 | 1 | s50 |
| 51 | 0 | 1 | 1 | -1 | s51 |
| 52 | 0 | 1 | 1 | 0 | s52 |
| 53 | 0 | 1 | 1 | 1 | s53 |
| 54 | 1 | -1 | -1 | -1 | s54 |
| 55 | 1 | -1 | -1 | 0 | s55 |
| 56 | 1 | -1 | -1 | 1 | s56 |
| 57 | 1 | -1 | 0 | -1 | s57 |
| 58 | 1 | -1 | 0 | 0 | s58 |
| 59 | 1 | -1 | 0 | 1 | s59 |
| 60 | 1 | -1 | 1 | -1 | s60 |
| 61 | 1 | -1 | 1 | 0 | s61 |
| 62 | 1 | -1 | 1 | 1 | s62 |
| 63 | 1 | 0 | -1 | -1 | s63 |
| 64 | 1 | 0 | -1 | 0 | s64 |
| 65 | 1 | 0 | -1 | 1 | s65 |
| 66 | 1 | 0 | 0 | -1 | s66 |
| 67 | 1 | 0 | 0 | 0 | s67 |
| 68 | 1 | 0 | 0 | 1 | s68 |
| 69 | 1 | 0 | 1 | -1 | s69 |
| 70 | 1 | 0 | 1 | 0 | s70 |
| 71 | 1 | 0 | 1 | 1 | s71 |
| 72 | 1 | 1 | -1 | -1 | s72 |
| 73 | 1 | 1 | -1 | 0 | s73 |
| 74 | 1 | 1 | -1 | 1 | s74 |
| 75 | 1 | 1 | 0 | -1 | s75 |
| 76 | 1 | 1 | 0 | 0 | s76 |
| 77 | 1 | 1 | 0 | 1 | s77 |
| 78 | 1 | 1 | 1 | -1 | s78 |
| 79 | 1 | 1 | 1 | 0 | s79 |
| 80 | 1 | 1 | 1 | 1 | s80 |

FIG. 19B

| | | | | | |
|---|---|---|---|---|---|
| 41 | 0 | 0 | 0 | 1 | s39 |
| 42 | 0 | 0 | 1 | -1 | s38 |
| 43 | 0 | 0 | 1 | 0 | s37 |
| 44 | 0 | 0 | 1 | 1 | s36 |
| 45 | 0 | 1 | -1 | -1 | s35 |
| 46 | 0 | 1 | -1 | 0 | s34 |
| 47 | 0 | 1 | -1 | 1 | s33 |
| 48 | 0 | 1 | 0 | -1 | s32 |
| 49 | 0 | 1 | 0 | 0 | s31 |
| 50 | 0 | 1 | 0 | 1 | s30 |
| 51 | 0 | 1 | 1 | -1 | s29 |
| 52 | 0 | 1 | 1 | 0 | s28 |
| 53 | 0 | 1 | 1 | 1 | s27 |
| 54 | 1 | -1 | -1 | -1 | s26 |
| 55 | 1 | -1 | -1 | 0 | s25 |
| 56 | 1 | -1 | -1 | 1 | s24 |
| 57 | 1 | -1 | 0 | -1 | s23 |
| 58 | 1 | -1 | 0 | 0 | s22 |
| 59 | 1 | -1 | 0 | 1 | s21 |
| 60 | 1 | -1 | 1 | -1 | s20 |
| 61 | 1 | -1 | 1 | 0 | s19 |
| 62 | 1 | -1 | 1 | 1 | s18 |
| 63 | 1 | 0 | -1 | -1 | s17 |
| 64 | 1 | 0 | -1 | 0 | s16 |
| 65 | 1 | 0 | -1 | 1 | s15 |
| 66 | 1 | 0 | 0 | -1 | s14 |
| 67 | 1 | 0 | 0 | 0 | s13 |
| 68 | 1 | 0 | 0 | 1 | s12 |
| 69 | 1 | 0 | 1 | -1 | s11 |
| 70 | 1 | 0 | 1 | 0 | s10 |
| 71 | 1 | 0 | 1 | 1 | s9 |
| 72 | 1 | 1 | -1 | -1 | s8 |
| 73 | 1 | 1 | -1 | 0 | s7 |
| 74 | 1 | 1 | -1 | 1 | s6 |
| 75 | 1 | 1 | 0 | -1 | s5 |
| 76 | 1 | 1 | 0 | 0 | s4 |
| 77 | 1 | 1 | 0 | 1 | s3 |
| 78 | 1 | 1 | 1 | -1 | s2 |
| 79 | 1 | 1 | 1 | 0 | s1 |
| 80 | 1 | 1 | 1 | 1 | s0 |

FIG. 19C

| | | | | | |
|---|---|---|---|---|---|
| 41 | 0 | 0 | 0 | 1 | -s39 |
| 42 | 0 | 0 | 1 | -1 | -s38 |
| 43 | 0 | 0 | 1 | 0 | -s37 |
| 44 | 0 | 0 | 1 | 1 | -s36 |
| 45 | 0 | 1 | -1 | -1 | -s35 |
| 46 | 0 | 1 | -1 | 0 | -s34 |
| 47 | 0 | 1 | -1 | 1 | -s33 |
| 48 | 0 | 1 | 0 | -1 | -s32 |
| 49 | 0 | 1 | 0 | 0 | -s31 |
| 50 | 0 | 1 | 0 | 1 | -s30 |
| 51 | 0 | 1 | 1 | -1 | -s29 |
| 52 | 0 | 1 | 1 | 0 | -s28 |
| 53 | 0 | 1 | 1 | 1 | -s27 |
| 54 | 1 | -1 | -1 | -1 | -s26 |
| 55 | 1 | -1 | -1 | 0 | -s25 |
| 56 | 1 | -1 | -1 | 1 | -s24 |
| 57 | 1 | -1 | 0 | -1 | -s23 |
| 58 | 1 | -1 | 0 | 0 | -s22 |
| 59 | 1 | -1 | 0 | 1 | -s21 |
| 60 | 1 | -1 | 1 | -1 | -s20 |
| 61 | 1 | -1 | 1 | 0 | -s19 |
| 62 | 1 | -1 | 1 | 1 | -s18 |
| 63 | 1 | 0 | -1 | -1 | -s17 |
| 64 | 1 | 0 | -1 | 0 | -s16 |
| 65 | 1 | 0 | -1 | 1 | -s15 |
| 66 | 1 | 0 | 0 | -1 | -s14 |
| 67 | 1 | 0 | 0 | 0 | -s13 |
| 68 | 1 | 0 | 0 | 1 | -s12 |
| 69 | 1 | 0 | 1 | -1 | -s11 |
| 70 | 1 | 0 | 1 | 0 | -s10 |
| 71 | 1 | 0 | 1 | 1 | -s9 |
| 72 | 1 | 1 | -1 | -1 | -s8 |
| 73 | 1 | 1 | -1 | 0 | -s7 |
| 74 | 1 | 1 | -1 | 1 | -s6 |
| 75 | 1 | 1 | 0 | -1 | -s5 |
| 76 | 1 | 1 | 0 | 0 | -s4 |
| 77 | 1 | 1 | 0 | 1 | -s3 |
| 78 | 1 | 1 | 1 | -1 | -s2 |
| 79 | 1 | 1 | 1 | 0 | -s1 |
| 80 | 1 | 1 | 1 | 1 | -s0 |

FIG. 19D

| Combination | d0 | d1 | d2 | d3 | Offset |
| --- | --- | --- | --- | --- | --- |
| 0 | 0 | 1 | 0 | -1 | s0 |
| 1 | 0 | -1 | 0 | 1 | s1 |
| 2 | 1 | 0 | -1 | 0 | s2 |
| 3 | -1 | 0 | 1 | 0 | s3 |
| 4 | 1 | 1 | -1 | -1 | s4 |
| 5 | 1 | -1 | -1 | 1 | s5 |
| 6 | -1 | -1 | 1 | 1 | s6 |
| 7 | -1 | 1 | 1 | -1 | s7 |
| 8 | -1 | 0 | 0 | 0 | s8 |
| 9 | 0 | -1 | 0 | 0 | s9 |
| 10 | 0 | 0 | -1 | 0 | s10 |
| 11 | 0 | 0 | 0 | -1 | s11 |
| 12 | 1 | 0 | 0 | 0 | s12 |
| 13 | 0 | 1 | 0 | 0 | s13 |
| 14 | 0 | 0 | 1 | 0 | s14 |
| 15 | 0 | 0 | 0 | 1 | s15 |
| 16 | 0 | 0 | 0 | 0 | s16 |

FIG. 19E

| Combination | d0 | d1 | d2 | d3 | Offset |
| --- | --- | --- | --- | --- | --- |
| 0 | 0 | 1 | 0 | -1 | s0 |
| 1 | 0 | -1 | 0 | 1 | s1 |
| 2 | 1 | 0 | -1 | 0 | s2 |
| 3 | -1 | 0 | 1 | 0 | s3 |
| 4 | 1 | 1 | -1 | -1 | s4 |
| 5 | 1 | -1 | -1 | 1 | s5 |
| 6 | -1 | -1 | 1 | 1 | s6 |
| 7 | -1 | 1 | 1 | -1 | s7 |
| 8 | -1 | 0 | 0 | 0 | s8 |
| 9 | 0 | -1 | 0 | 0 | s9 |
| 10 | 0 | 0 | -1 | 0 | s10 |
| 11 | 0 | 0 | 0 | -1 | s11 |
| 12 | 1 | 0 | 0 | 0 | s12 |
| 13 | 0 | 1 | 0 | 0 | s13 |
| 14 | 0 | 0 | 1 | 0 | s14 |
| 15 | 0 | 0 | 0 | 1 | s15 |

FIG. 19F

| Combination | d0 | d1 | d2 | d3 | Offset |
|---|---|---|---|---|---|
| 0 | 0 | 1 | 0 | -1 | s0 |
| 1 | 0 | -1 | 0 | 1 | s1 |
| 2 | 1 | 0 | -1 | 0 | s2 |
| 3 | -1 | 0 | 1 | 0 | s3 |
| 4 | 1 | 1 | -1 | -1 | s4 |
| 5 | 1 | -1 | -1 | 1 | s5 |
| 6 | -1 | -1 | 1 | 1 | s6 |
| 7 | -1 | 1 | 1 | -1 | s7 |
| 8 | -1 | 0 | 0 | 0 | s8 |
| 9 | 0 | -1 | 0 | 0 | s9 |
| 10 | 0 | 0 | -1 | 0 | s10 |
| 11 | 0 | 0 | 0 | -1 | s11 |
| 12 | 1 | 0 | 0 | 0 | s12 |
| 13 | 0 | 1 | 0 | 0 | s13 |
| 14 | 0 | 0 | 1 | 0 | s14 |
| 15 | 0 | 0 | 0 | 1 | s15 |
| 16 | -1 | -1 | 0 | 1 | s16 |
| 17 | -1 | -1 | 1 | 0 | s17 |
| 18 | -1 | 0 | 1 | -1 | s18 |
| 19 | -1 | 0 | 1 | 1 | s19 |
| 20 | -1 | 1 | 0 | -1 | s20 |
| 21 | -1 | 1 | 1 | 0 | s21 |
| 22 | 0 | -1 | -1 | 1 | s22 |
| 23 | 0 | -1 | 1 | 1 | s23 |
| 24 | 0 | 1 | -1 | -1 | s24 |
| 25 | 0 | 1 | 1 | -1 | s25 |
| 26 | 1 | -1 | -1 | 0 | s26 |
| 27 | 1 | -1 | 0 | 1 | s27 |
| 28 | 1 | 0 | -1 | -1 | s28 |
| 29 | 1 | 0 | -1 | 1 | s29 |
| 30 | 1 | 1 | -1 | 0 | s30 |
| 31 | 1 | 1 | 0 | -1 | s31 |
| 32 | 0 | 0 | 0 | 0 | s32 |

FIG. 19G

| Combination | d0 | d1 | d2 | d3 | Offset |
| --- | --- | --- | --- | --- | --- |
| 0 | 0 | 1 | 0 | -1 | s0 |
| 1 | 0 | -1 | 0 | 1 | s1 |
| 2 | 1 | 0 | -1 | 0 | s2 |
| 3 | -1 | 0 | 1 | 0 | s3 |
| 4 | 1 | 1 | -1 | -1 | s4 |
| 5 | 1 | -1 | -1 | 1 | s5 |
| 6 | -1 | -1 | 1 | 1 | s6 |
| 7 | -1 | 1 | 1 | -1 | s7 |
| 8 | -1 | 0 | 0 | 0 | s8 |
| 9 | 0 | -1 | 0 | 0 | s9 |
| 10 | 0 | 0 | -1 | 0 | s10 |
| 11 | 0 | 0 | 0 | -1 | s11 |
| 12 | 1 | 0 | 0 | 0 | s12 |
| 13 | 0 | 1 | 0 | 0 | s13 |
| 14 | 0 | 0 | 1 | 0 | s14 |
| 15 | 0 | 0 | 0 | 1 | s15 |
| 16 | -1 | -1 | 0 | 1 | s16 |
| 17 | -1 | -1 | 1 | 0 | s17 |
| 18 | -1 | 0 | 1 | -1 | s18 |
| 19 | -1 | 0 | 1 | 1 | s19 |
| 20 | -1 | 1 | 0 | -1 | s20 |
| 21 | -1 | 1 | 1 | 0 | s21 |
| 22 | 0 | -1 | -1 | 1 | s22 |
| 23 | 0 | -1 | 1 | 1 | s23 |
| 24 | 0 | 1 | -1 | -1 | s24 |
| 25 | 0 | 1 | 1 | -1 | s25 |
| 26 | 1 | -1 | -1 | 0 | s26 |
| 27 | 1 | -1 | 0 | 1 | s27 |
| 28 | 1 | 0 | -1 | -1 | s28 |
| 29 | 1 | 0 | -1 | 1 | s29 |
| 30 | 1 | 1 | -1 | 0 | s30 |
| 31 | 1 | 1 | 0 | -1 | s31 |

FIG. 19H

FILTER OFFSET VALUE MAPPING

INCORPORATION BY REFERENCE

This present application is a continuation of U.S. application Ser. No. 17/360,840, filed on Jun. 28, 2021, which claims the benefit of priority to U.S. Provisional Application No. 63/113,120, "IMPROVED CROSS-COMPONENT SAMPLE OFFSET," filed on Nov. 12, 2020. The entire disclosures of the prior applications are hereby incorporated by reference in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920× 1080 luminance samples and associated chrominance samples. The series of pictures can have a fixed or variable picture rate (informally also known as frame rate) of, for example, 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding and/or decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may be predicted itself.

Referring to FIG. 1A, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (105) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar MV derived from MVs of a neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described herein is a technique henceforth referred to as "spatial merge."

Referring to FIG. 1C, a current block (111) can include samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (112 through 116, respectively). In H.265, the MV prediction can use predictors from the same reference picture that the neighboring block is using.

SUMMARY

Aspects of the disclosure provide apparatuses for video encoding/decoding. An apparatus includes processing circuitry that decodes prediction information of a current block in a current picture that is a part of a coded video sequence. The prediction information indicates a plurality of combinations of processed reconstructed samples and corresponding output values of a filter process. The processing circuitry performs the filter process on processed reconstructed samples of a first color component of the current block. The processed reconstructed samples of the first color are not included in the plurality of combinations of the processed reconstructed samples. The processing circuitry determines an output value of the filter process based on one of a default value, a predicted output value, and one of the output values indicated in the prediction information. The processing circuitry reconstructs the current block based on the output value being applied to reconstructed samples of a second color component of the current block. The second color component is different from the first color component.

In one embodiment, the processing circuitry determines one of a first value and a second value as the output value of the filter process. The first value is the one of the output values indicated in the prediction information, and the second value is an opposite number of the first value.

In one embodiment, each of the processed reconstructed samples of the first color component is an opposite number of a corresponding processed reconstructed sample in one of the plurality of combinations of processed reconstructed samples indicated in the prediction information, and the one of the output values indicated in the prediction information corresponds to the one of the plurality of combinations of processed reconstructed samples indicated in the prediction information.

In one embodiment, a sum of an index of the processed reconstructed samples of the first color component in a mapping table of the filter process and an index of the one of the output values indicated in the prediction information in the mapping table of the filter process is equal to a maximum index of the mapping table.

In one embodiment, the processing circuitry determines the default value as the output value of the filter process based on the prediction information indicating that the plurality of combinations of processed reconstructed samples indicated in the prediction information is a subset of a total number of combinations of processed reconstructed samples in the filter process.

In one embodiment, the predicted output value is determined based on an output value of the filter processing applied to another coding block.

In one embodiment, the processed reconstructed samples of the first color component are determined based on reconstructed samples of the first color component that are output from a first coding module, and the reconstructed samples of the second color component are output from the first coding module or a second coding module that is applied after the first coding module.

Aspects of the disclosure provide methods for video encoding/decoding. In the method, prediction information of a current block in a current picture that is a part of a coded video sequence is decoded. The prediction information indicates a plurality of combinations of processed reconstructed samples and corresponding output values of a filter process. The filter process is performed on processed reconstructed samples of a first color component of the current block. The processed reconstructed samples of the first color are not included in the plurality of combinations of the processed reconstructed samples. An output value of the filter process is determined based on one of a default value, a predicted output value, and one of the output values indicated in the prediction information. The current block is reconstructed based on the output value being applied to reconstructed samples of a second color component of the current block. The second color component is different from the first color component.

Aspects of the disclosure also provide non-transitory computer-readable mediums storing instructions which when executed by at least one processor cause the at least one processor to perform any one or a combination of the methods for video decoding.

BRIEF DESCRIPTION OF THE DRAWINGS

Further features, the nature, and various advantages of the disclosed subject matter will be more apparent from the following detailed description and the accompanying drawings in which:

FIG. 1A is a schematic illustration of an exemplary subset of intra prediction modes;

FIG. 1B is an illustration of exemplary intra prediction directions;

FIG. 2 is a schematic illustration of a simplified block diagram of a communication system in accordance with an embodiment;

Figures 9A, 9B, 9C, 9D:
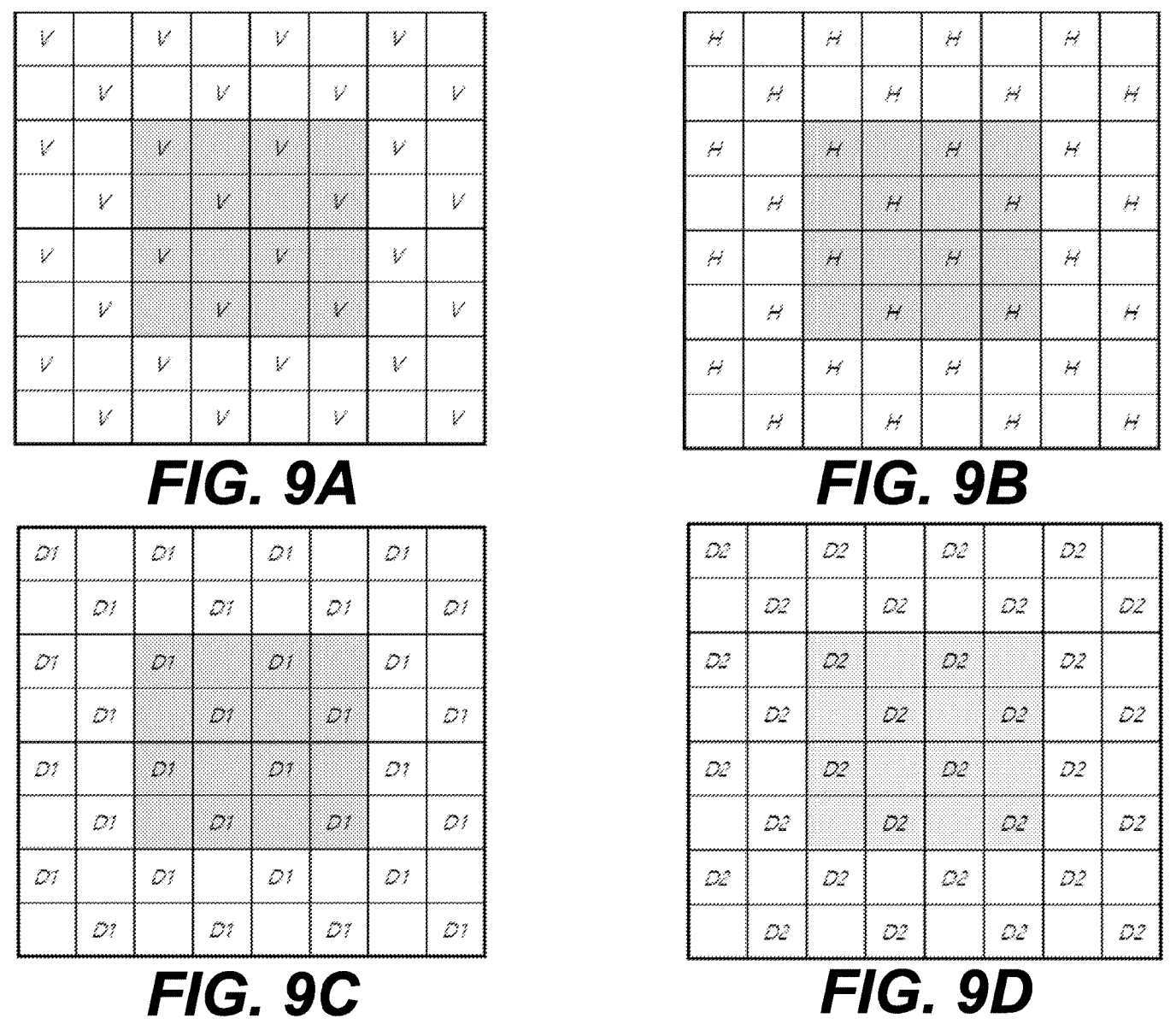

FIGS. 9A-9D show exemplary subsampled positions used for gradient calculations of vertical, horizontal, and two diagonal directions, respectively, in accordance with some embodiments;

FIG. 15 shows exemplary locations of chroma samples relative to luma samples in accordance with some embodiments;

FIGS. 19A-19B show a table tabulating 81 exemplary combinations of non-linear mappings in the CCSO filter in accordance with an embodiment;

FIG. 19C shows a table tabulating 40 exemplary combinations of non-linear mappings that are not signaled and can be derived based on the table shown in FIG. 19A in accordance with an embodiment;

FIG. 19D shows another table tabulating 40 exemplary combinations of non-linear mappings that are not signaled and can be derived based on the table shown in FIG. 19A in accordance with an embodiment;

FIG. 19E shows a table tabulating 17 signaled combinations of non-linear mappings in the CCSO filter in accordance with an embodiment;

FIG. 19F shows a table tabulating 16 signaled combinations of non-linear mappings in the CCSO filter in accordance with an embodiment;

FIG. 19G shows a table tabulating 33 signaled combinations of non-linear mappings in the CCSO filter in accordance with an embodiment;

FIG. 19H shows a table tabulating 32 signaled combinations of non-linear mappings in the CCSO filter in accordance with an embodiment;

DETAILED DESCRIPTION OF EMBODIMENTS

I. Video Decoder and Encoder Systems

Figure 1C:
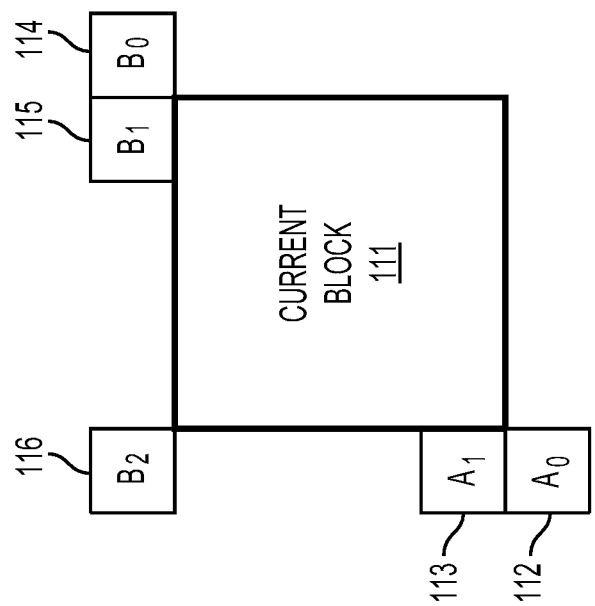
FIG. 1C is a schematic illustration of a current block and its surrounding spatial merge candidates in one example.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
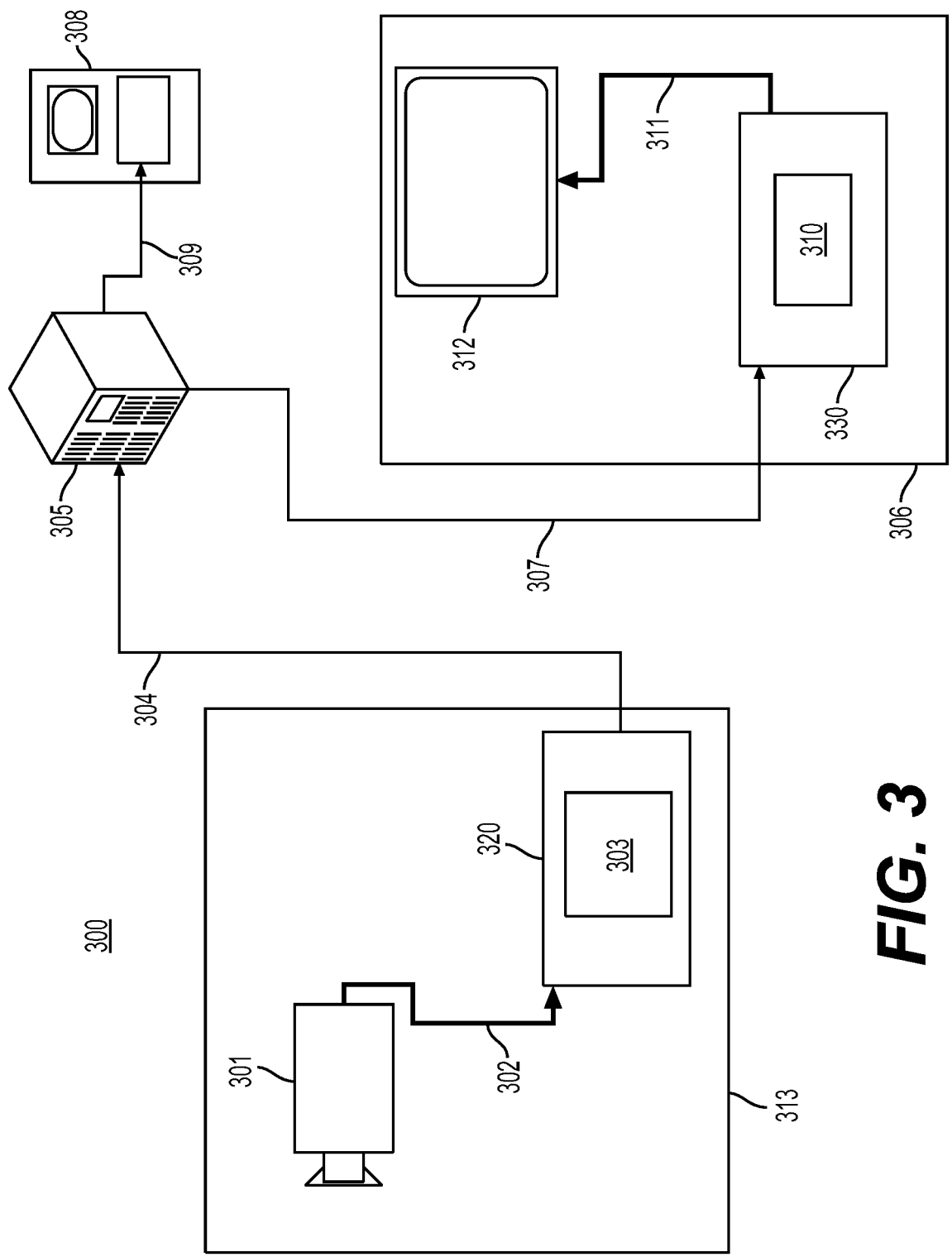
FIG. 3 is a schematic illustration of a simplified block diagram of a communication system in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick, and the like.

A streaming system may include a capture subsystem (313) that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
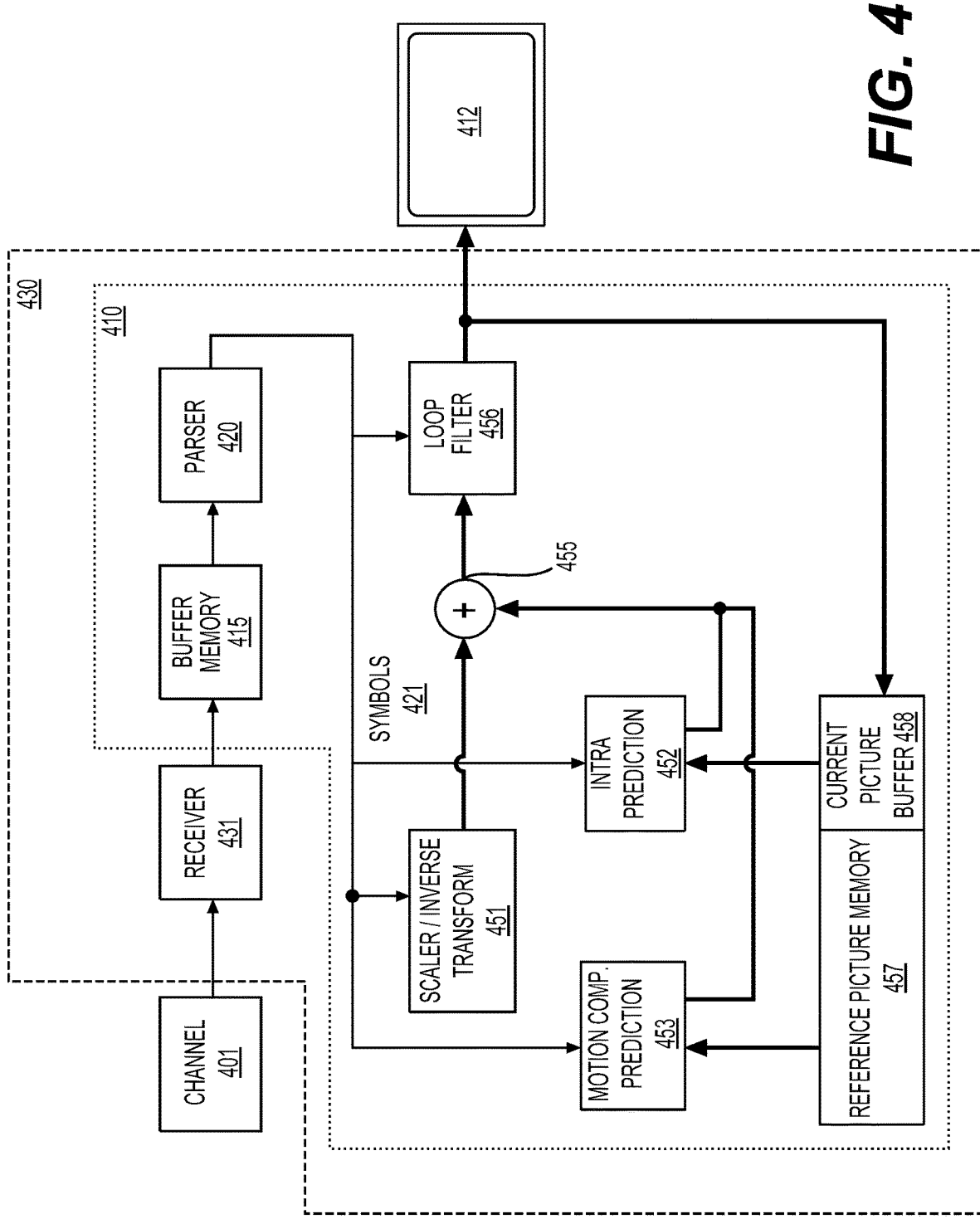
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431)

and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, MVs, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information that the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by MVs, available to the motion compensation prediction unit (453) in the form of symbols (421) that can have, for example X, Y, and reference picture components. Motion compensation also can include interpolation of sample values as fetched from the reference picture memory (457) when sub-sample exact MVs are in use, MV prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
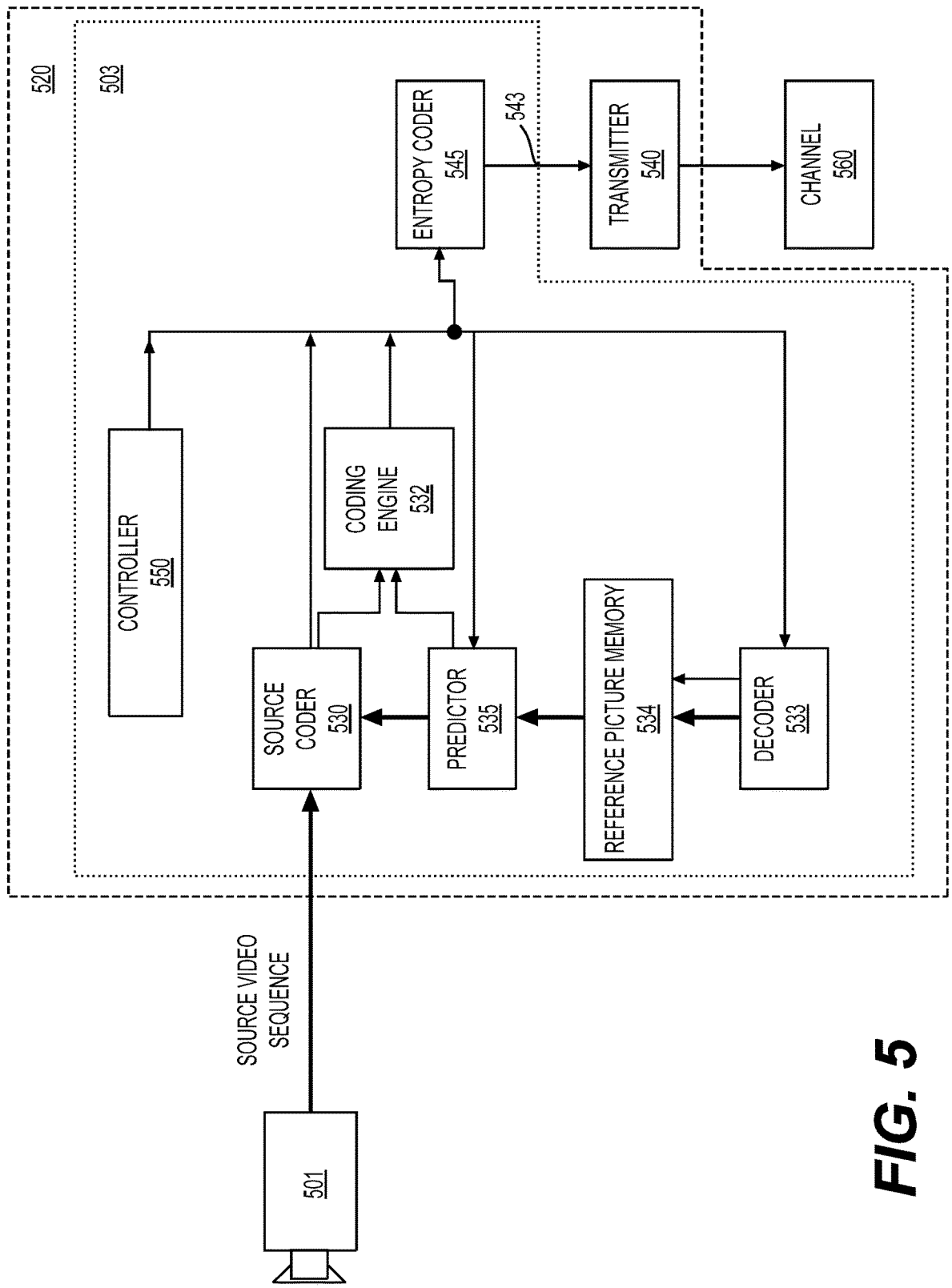
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum MV allowed reference area, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415) and the parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture MVs, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by losslessly compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one MV and reference index to predict the sample values of each block.

A bi-directionally predictive picture (B Picture) may be one that may be coded and decoded using intra prediction or inter prediction using at most two MVs and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a MV. The MV points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first MV that points to a first reference block in the first reference picture, and a second MV that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quad-tree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
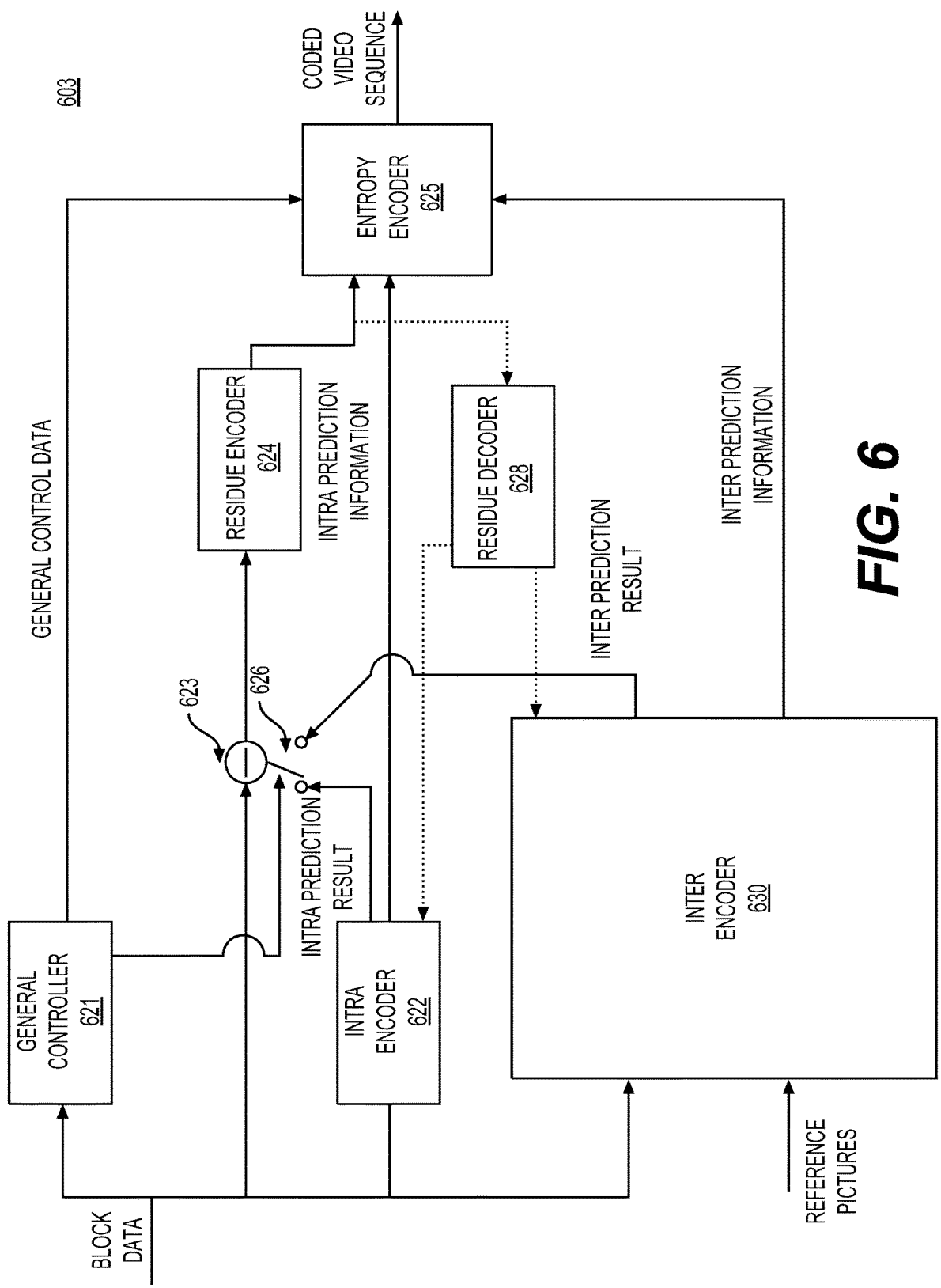
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the MV is derived from one or more MV predictors without the benefit of a coded MV component outside the predictors. In certain other video coding technologies, a MV component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, MVs, merge mode information), and calculate inter prediction results (e.g., prediction block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., prediction block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard such as HEVC. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
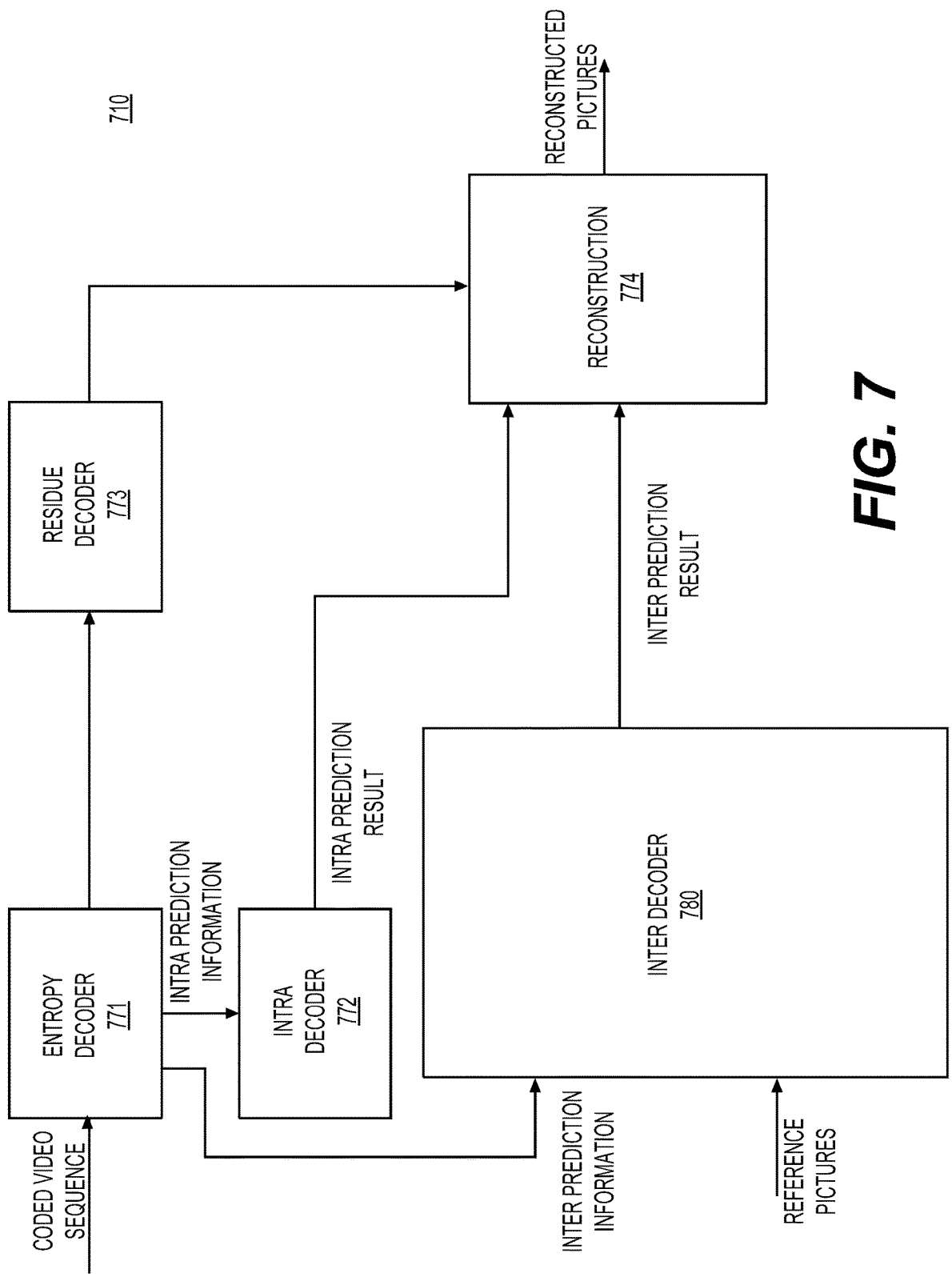
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (603), and the video decoders (310), (410), and (710) can be implemented using one or more processors that execute software instructions.

II. Adaptive Loop Filter

In some related examples such as VVC Draft 8, an adaptive loop filter (ALF) with block-based filter adaption can be applied. For a luma component, one among 25 filters can be selected for each 4×4 block, based on a directionality and an activity of local gradients of the respective 4×4 block.

Figure 8B:
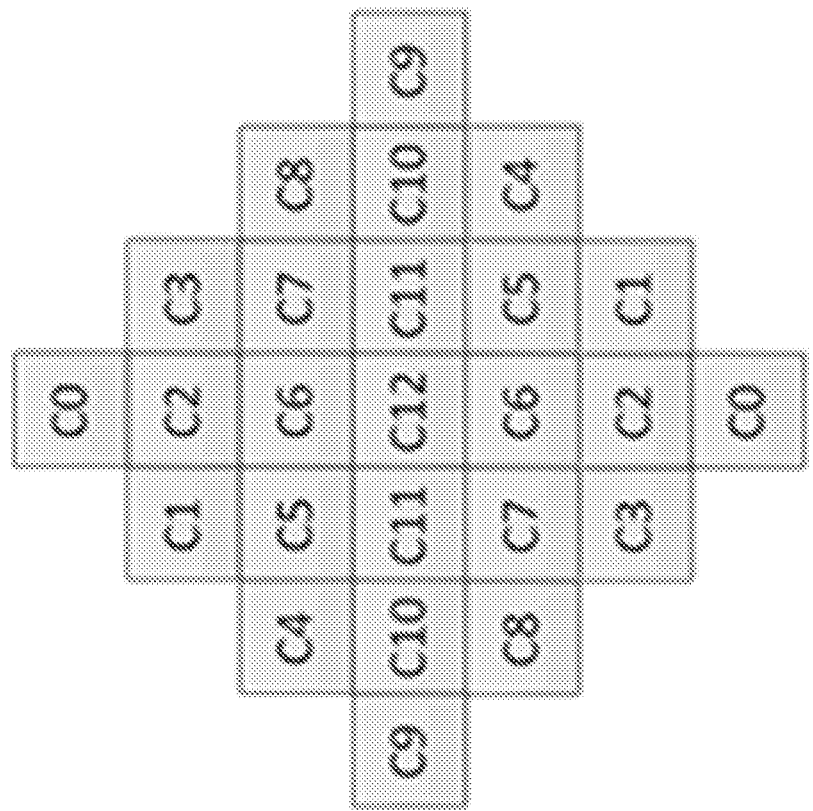
FIGS. 8A-8B show exemplary diamond filter shapes of an adaptive loop filter (ALF) in accordance with some embodiments.
Figure 8A:
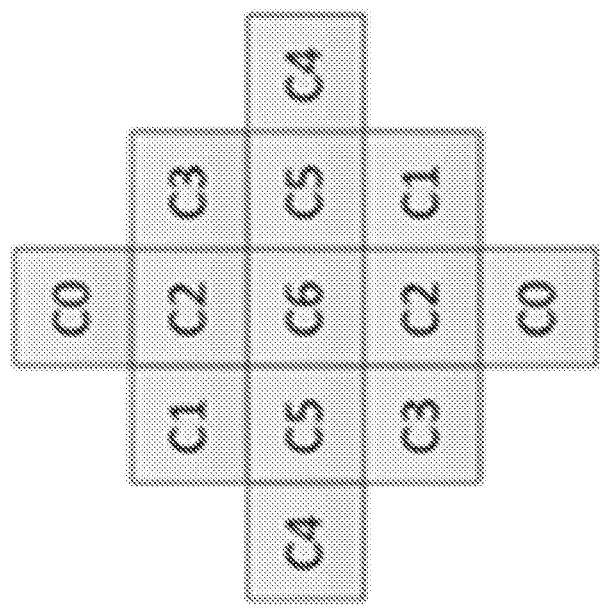

FIGS. 8A-8B show exemplary diamond filter shapes of the ALF according to some embodiments of this disclosure. FIG. 8A shows a 5×5 diamond shape that can be applied to chroma components and FIG. 8B shows a 7×7 diamond shape that can be applied to a luma component.

In some related examples, for a luma component, each 4×4 block can be categorized into one out of 25 classes. A classification index C of a 4×4 block can be derived based on a directionality D and a quantized value of an activity $\hat{A}$ of the 4×4 block as follows:

$$C = 5D + \hat{A} \quad \text{Eq. (1)}$$

To calculate D and $\hat{A}$, gradients of a horizontal, a vertical, and two diagonal directions of the 4×4 block can first be calculated using 1-D Laplacian as follows:

$$g_v = \Sigma_{k=i-2}^{i+3} \Sigma_{l=j-2}^{j+3} V_{k,l}, \quad V_{k,l} = |2R(k,l) - R(k,l-1) - R(k,l+1)| \quad \text{Eq. (2)}$$

$$g_h = \Sigma_{k=i-2}^{i+3} \Sigma_{l=j-2}^{j+3} H_{k,l}, \quad H_{k,l} = |2R(k,l) - R(k-1,l) - R(k+1,l)| \quad \text{Eq. (3)}$$

$$g_{d1} = \Sigma_{k=i-2}^{i+3} \Sigma_{l=j-3}^{j+3} D1_{k,l}, \quad D1_{k,l} = |2R(k,l) - R(k-1,l-1) - R(k+1,l+1)| \quad \text{Eq. (4)}$$

$$g_{d2} = \Sigma_{k=i-2}^{i+3} \Sigma_{j=j-2}^{j+3} D2_{k,l}, \quad D2_{k,l} = |2R(k,l) - R(k-1,l+1) - R(k+1,l-1)| \quad \text{Eq. (5)}$$

where indices i and j refer to coordinates of upper left samples within the 4×4 block and R(i, j) indicates a reconstructed sample at coordinate (i, j).

To reduce the complexity of the block classification, a subsampled 1-D Laplacian calculation can be applied. FIGS. 9A-9D show exemplary subsampled positions used for the gradient calculations of the vertical, horizontal, and two diagonal directions, respectively.

Then, the maximum and minimum values of the gradients of the horizontal and vertical directions can be set as:

$$g_{h,v}^{max} = \max(g_h, g_v) \quad \text{Eq. (6)}$$

$$g_{h,v}^{min} = \min(g_h, g_v) \quad \text{Eq. (7)}$$

The maximum and minimum values of the gradients of the two diagonal directions can be set as:

$$g_{d1,d2}^{max} = \max(g_{d1}, g_{d2}) \quad \text{Eq. (8)}$$

$$g_{d1,d2}^{min} = \min(g_{d1}, g_{d2}) \quad \text{Eq. (9)}$$

To derive the value of the directionality D, these values can be compared against each other and with two thresholds $t_1$ and $t_2$.

Step 1: if both $g_{h,v}^{max} \leq t_1 \cdot g_{h,v}^{min}$ and $g_{d1,d2}^{max} \leq t_1 \cdot g_{d1,d2}^{min}$ are true, D is set to 0.

Step 2: if $g_{h,v}^{max}/g_{h,v}^{min} > g_{d1,d2}^{max}/g_{d1,d2}^{min}$, continue from Step 3; otherwise, continue from Step 4.

Step 3: if $g_{h,v}^{max} > t_2 \cdot g_{h,v}^{min}$, D is set to 2; otherwise, D is set to 1.

Step 4: if $g_{d1,d2}^{max} > t_2 \cdot g_{d1,d2}^{min}$, D is set to 4; otherwise, D is set to 3.

The activity value A is calculated as:

$$A = \Sigma_{k=i-2}^{i+3} \Sigma_{l=j-2}^{j+3} (V_{k,l} + H_{k,l}) \quad \text{Eq. (10)}$$

A is further quantized to a range of 0 to 4, inclusively, and the quantized value is denoted as $\hat{A}$.

For chroma components in a picture, no classification method is applied. For example, a single set of ALF coefficients can be applied for each chroma component.

Before filtering each 4×4 luma block, geometric transformations such as rotation, diagonal flipping, and vertical flipping are applied to the filter coefficients f(k, l) and to the corresponding filter clipping values c(k, l) depending on gradient values calculated for the respective block. This is equivalent to applying these transformations to samples in the filter support region, in order to make different blocks to which the ALF is applied more similar by aligning their directionalities.

Three geometric transformations, including diagonal flip, vertical flip, and rotation, can be described as follows:

$$\text{Diagonal: } f_D(k,l)=f(l,k),\ c_D(k,l)=c(l,k) \quad \text{Eq. (11)}$$

$$\text{Vertical flip: } f_V(k,l)=f(k,K-l-1),\ c_V(k,l)=c(k,K-l-1) \quad \text{Eq. (12)}$$

$$\text{Rotation: } f_R(k,l)=f(K-l-1,k),\ c_R(k,l)=c(K-l-1,k) \quad \text{Eq. (13)}$$

where K is a size of the filter and $0 \leq k, l \leq K-1$ are coordinates of the transformation coefficients, such that location (0,0) is at the upper left corner and location (K−1, K−1) is at the lower right corner. The transformations are applied to the filter coefficients f(k, l) and to the clipping values c(k, l) depending on gradient values calculated for the corresponding block. The relationship between the transformations and the gradients of the four directions can be summarized in Table 1.

TABLE 1

| Gradient values | Transformation |
| --- | --- |
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

In some related examples such as VVC Draft 8, filter parameters of the ALF are signaled in an adaptation parameter set (APS). In one APS, up to 25 sets of luma filter coefficients and clipping value indexes, and up to eight sets of chroma filter coefficients and clipping value indexes can be signaled. To reduce bits overhead, filter coefficients of different classifications for the luma component can be merged. In a slice header, the indices of the APSs used for a current slice are signaled. The signaling of the ALF is CTU-based in VVC Draft 8.

Clipping value indexes, which are decoded from the APS, allow clipping values to be determined using a table of the clipping values for the luma and chroma components. These clipping values are dependent on an internal bit depth. For example, the table of the clipping values can be obtained by the following formula:

$$\text{AlfClip}=\{\text{round}(2^{B-\alpha^* n})\ \text{for}\ n \in [0\ \ldots\ N-1]\} \quad \text{Eq. (14)}$$

with B being equal to the internal bit depth, α being a pre-defined constant value that is equal to 2.35, and N being equal to 4 which is the number of allowed clipping values in VVC Draft 8. Table 2 shows an example of the output of equation (14).

TABLE 2

| bitDepth | clipIdx 0 | clipIdx 1 | clipIdx 2 | clipIdx 3 |
| --- | --- | --- | --- | --- |
| 8 | 255 | 50 | 10 | 2 |
| 9 | 511 | 100 | 20 | 4 |
| 10 | 1023 | 201 | 39 | 8 |
| 11 | 2047 | 402 | 79 | 15 |
| 12 | 4095 | 803 | 158 | 31 |
| 13 | 8191 | 1607 | 315 | 62 |
| 14 | 16383 | 3214 | 630 | 124 |
| 15 | 32767 | 6427 | 1261 | 247 |
| 16 | 65535 | 12855 | 2521 | 495 |

In a slice header, up to 7 APS indices can be signaled to specify luma filter sets that are used for a current slice. The filtering process can be further controlled at a CTB level. A flag can be signaled to indicate whether the ALF is applied to a luma CTB. The luma CTB can choose a filter set among 16 fixed filter sets and the filter sets from APSs. A filter set index is signaled for the luma CTB to indicate which filter set is applied. The 16 fixed filter sets can be pre-defined and hard-coded in both the encoder and the decoder.

For a chroma component, an APS index can be signaled in a slice header to indicate chroma filter sets used for a current slice. At a CTB level, a filter index can be signaled for each chroma CTB if there is more than one chroma filter set in the APS.

The filter coefficients can be quantized with a norm being equal to 128. In order to restrict the multiplication complexity, a bitstream conformance can be applied so that a coefficient value of a non-central position can be in a range of −2⁷ to 2⁷−1, inclusive. A central position coefficient is not signaled in the bitstream and is considered to be equal to 128.

In some related examples such as VVC Draft 8, syntaxes and semantics of clipping indices and corresponding values can be defined as follows.

alf_luma_clip_idx[sfIdx][j] specifies a clipping index of a clipping value to be used before multiplying by the j-th coefficient of a signaled luma filter indicated by sfIdx. It is a requirement of a bitstream conformance that values of alf_luma_clip_idx[sfIdx][j] with sfIdx=0 . . . alf_luma_num_filters_signalled_minus1 and j=0 . . . 11 shall be in a range of 0 to 3, inclusive.

The luma filter clipping values AlfClipL[adaptation_parameter_set_id][filtIdx] with elements AlfClipL[adaptation_parameter_set_id][filtIdx][j], with filtIdx=0 . . . NumAlfFilters−1 and j=0 . . . 11 are derived in Table 2 depending on bitDepth set equal to BitDepthY and clipIdx set equal to alf_luma_clip_idx[alf_luma_coeff_delta_idx[filtIdx]][j].

alf_chroma_clip_idx[altIdx][j] specifies a clipping index of a clipping value to be used before multiplying by the j-th coefficient of an alternative chroma filter with index altIdx. It is a requirement of a bitstream conformance that values of alf_chroma_clip_idx[altIdx][j] with altIdx=0 . . . alf_chroma_num_alt_filters_minus1, j=0 . . . 5 shall be in a range of 0 to 3, inclusive.

The chroma filter clipping values AlfClipC[adaptation_parameter_set_id][altIdx] with elements AlfClipC[adaptation_parameter_set_id][altIdx][j], with altIdx=0 . . . alf_chroma_num_alt_filters_minus1, j=0 . . . 5 are derived in Table 2 depending on bitDepth set equal to BitDepthC and clipIdx set equal to alf_chroma_clip_idx[altIdx][j].

At the decoder side, when the ALF is enabled for a CTB, each sample R(i, j) within the CU is filtered, resulting in a corresponding sample value R'(i, j) as shown below, $$R'(i, j) = R(i, j) + \left(\left(\sum_{k\neq 0}\sum_{l\neq 0} f(k, l) \times K(R(i+k, j+l) - R(i, j), c(k, l)) + 64\right) \gg 7\right) \quad \text{Eq. (15)}$$

where f(k, l) denotes decoded filter coefficients, K(x, y) is a clipping function, and c(k, l) denotes decoded clipping parameters. Variables k and l vary between $-L/2$ and $L/2$ where L denotes a filter length. The clipping function K(x, y)=min(y, max(-y, x)) which corresponds to a function Clip3 (-y, y, x). By incorporating this clipping function, this loop filtering method becomes a non-linear process, as known as Non-Linear ALF. The selected clipping values are coded in the "alf_data" syntax element by using a Golomb encoding scheme corresponding to the index of the clipping value in Table 2. This encoding scheme is the same as the encoding scheme for the filter index.

Figure 10:
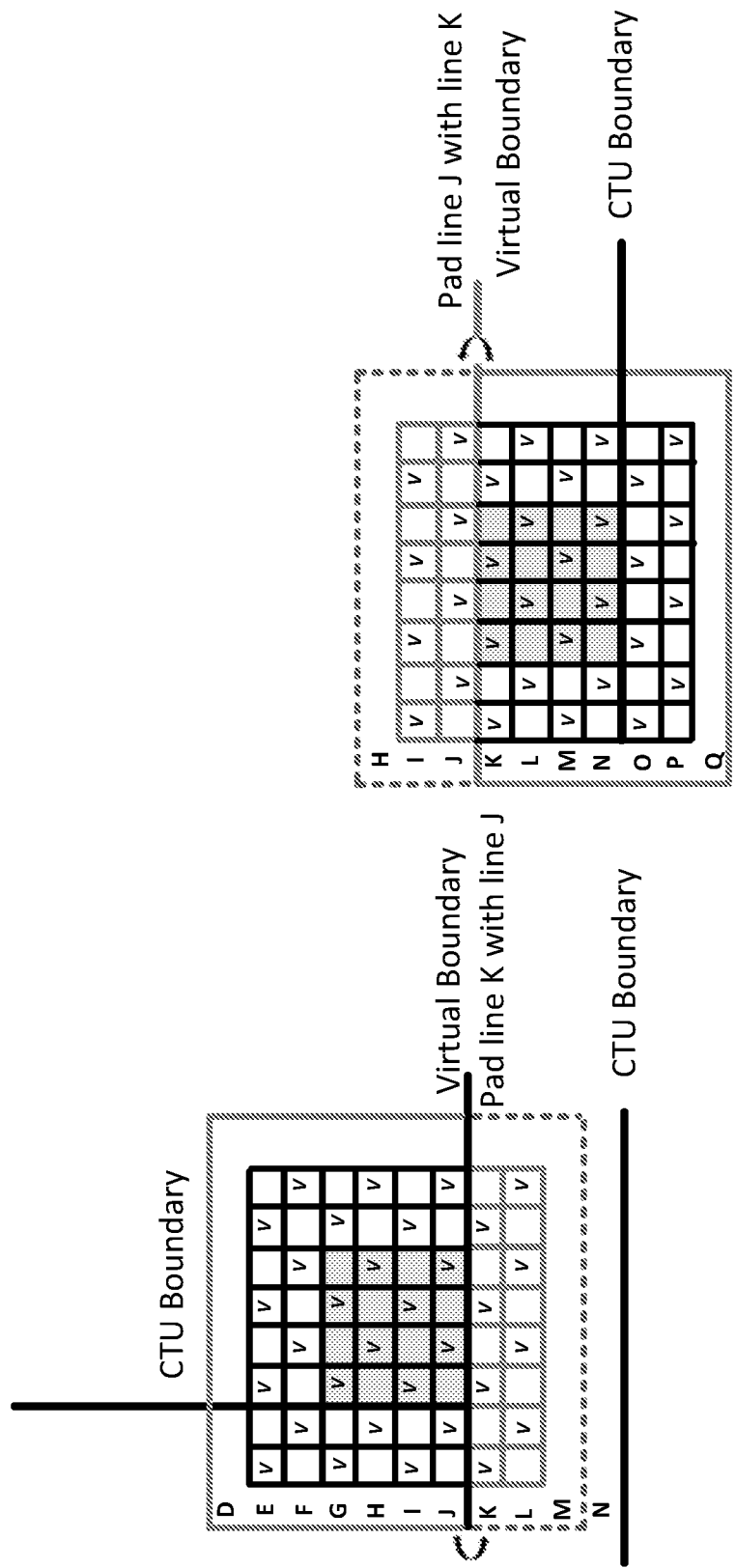
FIG. 10 shows an exemplary modified block classification that is applied to a luma component in accordance with an embodiment.

FIG. 10 shows an exemplary modified block classification that is applied to a luma component according to an embodiment of the disclosure. The modified block classification and filtering, which are employed for the samples near horizontal CTU boundaries, can reduce the line buffer requirement of the ALF. As shown in FIG. 10, a virtual boundary is defined as a line by shifting the horizontal CTU boundary with "N" samples, where N is equal to 4 for the luma component and 2 for the chroma components, respectively.

For the 1D Laplacian gradient calculation of a 4×4 block above the virtual boundary, only samples above the virtual boundary are used. Similarly, for the 1D Laplacian gradient calculation of a 4×4 block below the virtual boundary, only samples below the virtual boundary are used. The quantization of the activity value A is accordingly scaled by taking into account the reduced number of samples used in the 1D Laplacian gradient calculation.

Figure 11:
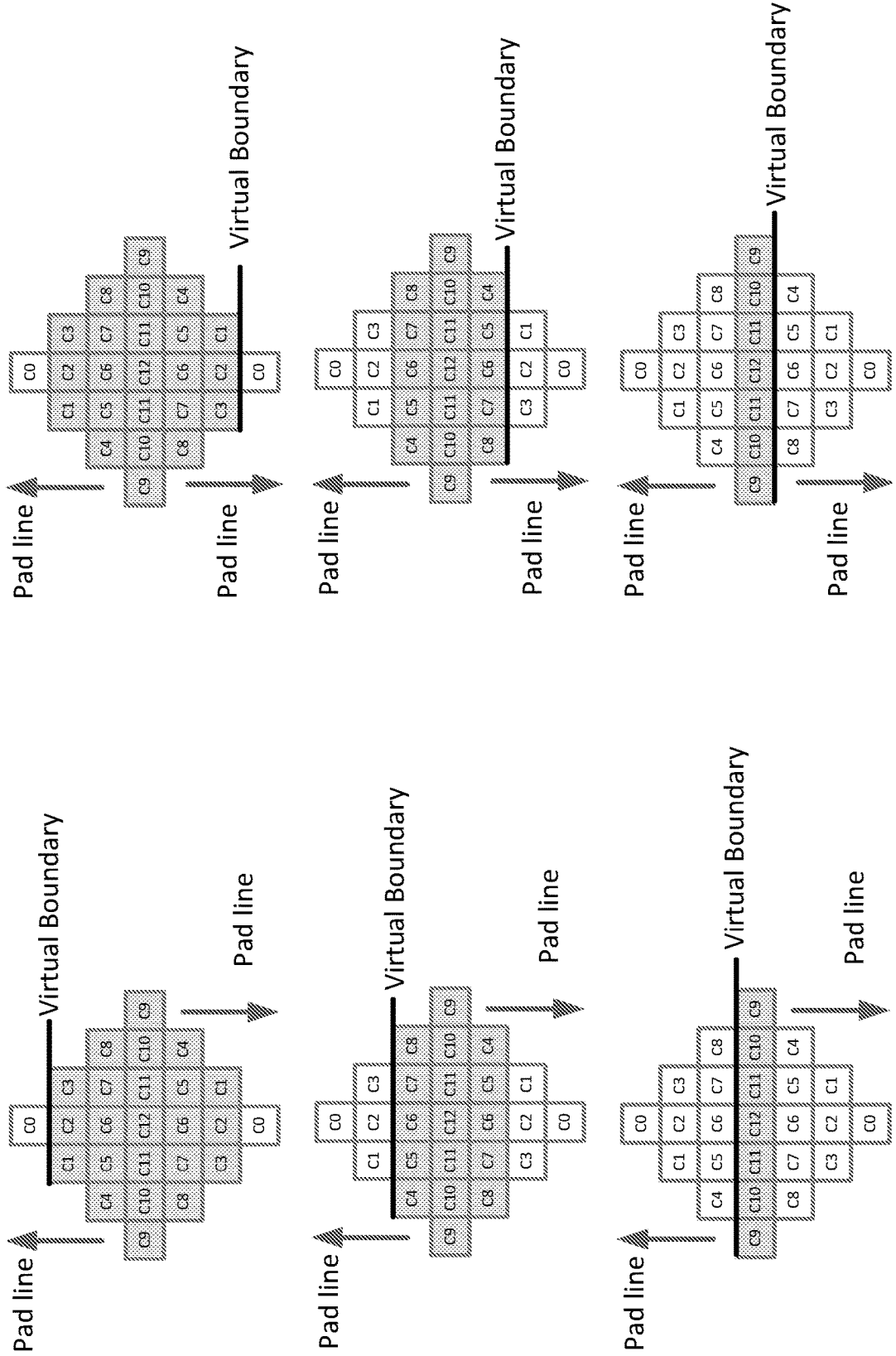
FIG. 11 shows exemplary modified ALFs for the luma component at virtual boundaries in accordance with some embodiments.

FIG. 11 shows exemplary modified ALFs for the luma component at virtual boundaries in accordance with some embodiments. For filtering processing, a symmetric padding operation at the virtual boundaries can be used for both luma and chroma components. As shown in FIG. 11, when a sample being filtered is located below a virtual boundary, neighboring samples that are located above the virtual boundary are padded. Meanwhile, corresponding samples at the other side are also padded, symmetrically.

In order to enhance coding efficiency, the coding unit synchronous picture quadtree-based ALP is used in some related examples. A luma picture can be split into several multi-level quadtree partitions, and each partition boundary is aligned to boundaries of largest coding units (LCUs). Each partition has its own filtering process and thus can be referred to as a filter unit (FU).

The 2-pass encoding flow is described as follows. At the first pass, a quadtree split pattern and a best filter of each FU are decided. Filtering distortions are estimated by fast filtering distortion estimation (FFDE) during the decision process. According to the decided quadtree split patterns and the selected filters of all FUs, the reconstructed picture is filtered. At the second pass, the CU synchronous ALF on/off control is performed. According to the ALF on/off results, the filtered picture from the first pass is partially recovered by the reconstructed picture.

Figure 12:
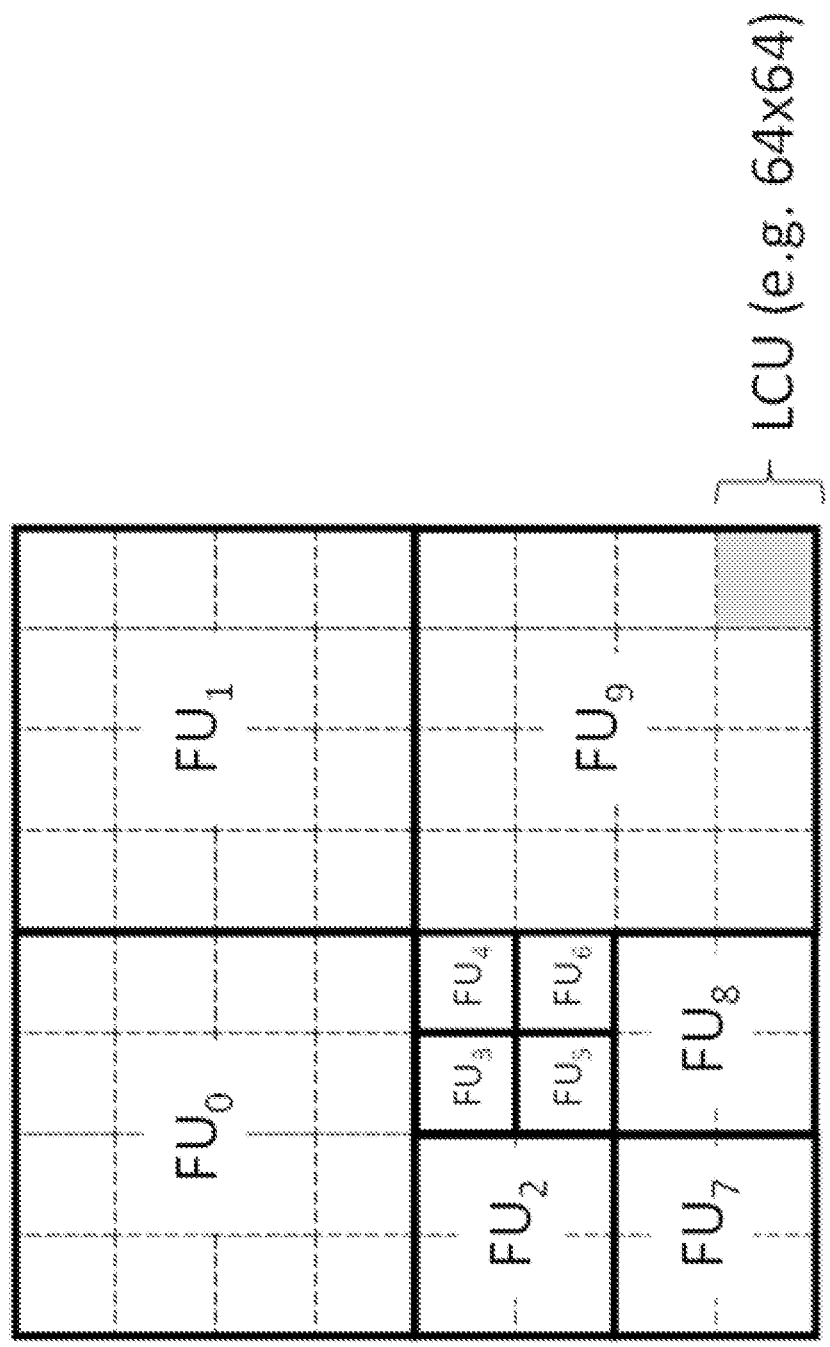
FIG. 12 shows an exemplary largest coding unit (LCU) aligned picture quadtree splitting in accordance with an embodiment.

FIG. 12 shows an exemplary LCU aligned picture quadtree splitting in accordance with an embodiment. A top-down splitting strategy is adopted to divide a picture into multi-level quadtree partitions by using a rate-distortion criterion. Each partition is referred to as a filter unit. The splitting process aligns the quadtree partitions with the LCU boundaries. An encoding order of the FUs follows a z-scan order. For example, as shown in FIG. 12, the picture is split into 10 FUs, and the encoding order is FU0, FU1, FU2, FU3, FU4, FU5, FU6, FU7, FU8, and FU9.

Figure 13:
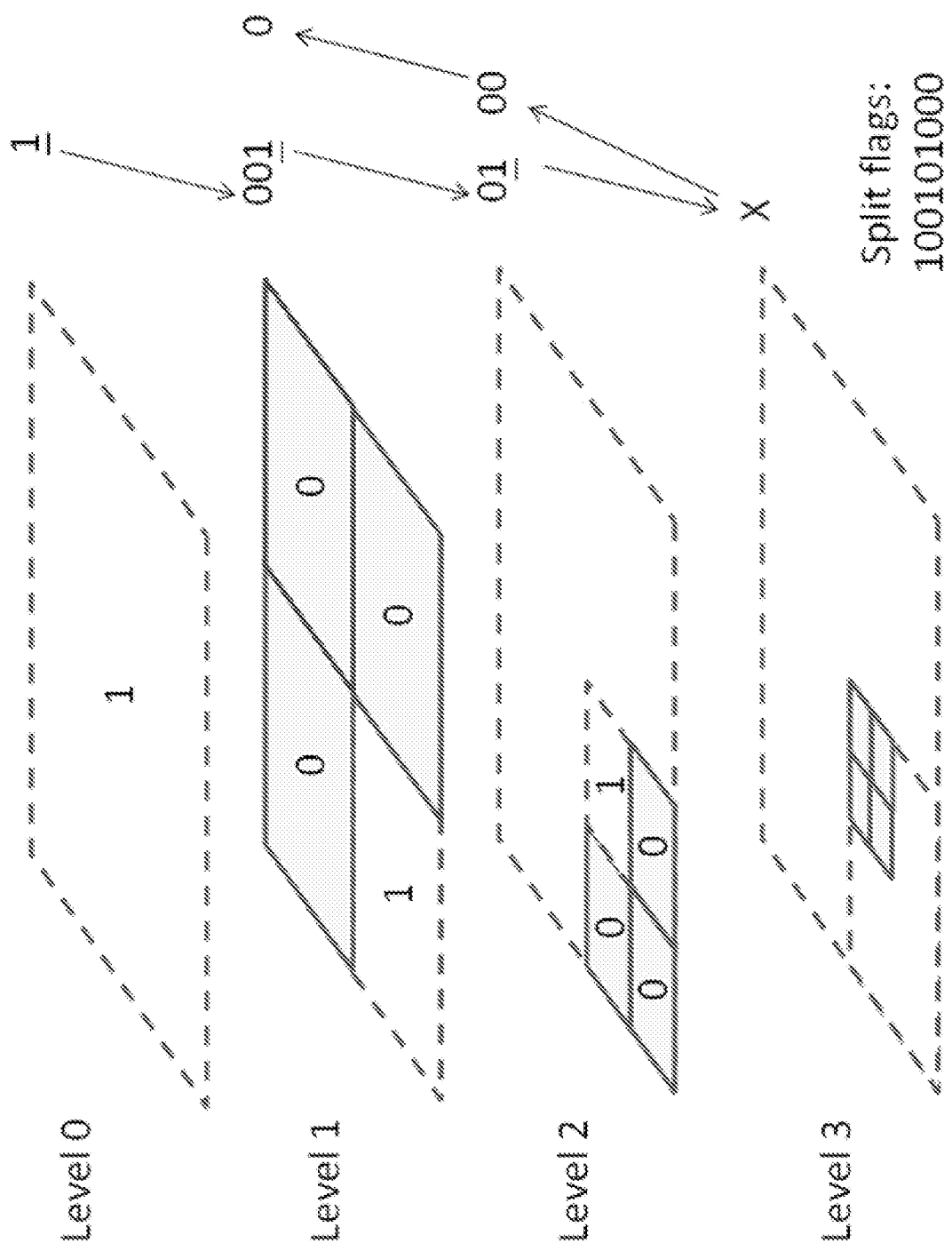
FIG. 13 shows exemplary quadtree split flags encoded in z-order in accordance with an embodiment.

FIG. 13 shows an exemplary quadtree split pattern in correspondence with FIG. 12. To indicate the picture quadtree split pattern, split flags can be encoded and transmitted in z-order.

The filter of each FU can be selected from two filter sets based on the rate-distortion criterion. The first set has ½-symmetric square-shaped and rhombus-shaped filters newly derived for the current FU. The second set comes from time-delayed filter buffers which store the filters previously derived for FUs of prior pictures. The filter with the minimum rate-distortion cost of these two sets can be chosen for the current FU. Similarly, if the current FU is not the smallest FU and can be further split into 4 children FUs, the rate-distortion costs of the 4 children FUs are calculated. By comparing the rate-distortion cost of the split and non-split cases recursively, the picture quadtree split pattern can be decided.

In some related examples, the maximum quadtree split level is 2, which means the maximum number of FUs is 16. During the quadtree split decision, the correlation values for deriving Wiener coefficients of the 16 FUs at a bottom quadtree level (smallest FUs) can be reused. The rest FUs can derive their Wiener filters from the correlations of the 16 FUs at the bottom quadtree level. Therefore, there is only one frame buffer access for deriving the filter coefficients of all FUs.

After the quadtree split pattern is decided, to further reduce the filtering distortion, the CU synchronous ALF on/off control can be performed. By comparing the filtering distortion and non-filtering distortion, the leaf CU can explicitly switch the ALF on/off in its local region. The coding efficiency may be further improved by redesigning the filter coefficients according to the ALF on/off results. However, the redesigning process needs additional frame buffer accesses. In some related examples, there is no redesign process after the CU synchronous ALF on/off decision in order to minimize the number of frame buffer accesses.

III. Cross Component Adaptive Loop Filter

In some related examples, a cross-component adaptive loop filter (CC-ALF) is employed. The CC-ALF makes use of luma sample values to refine each chroma component.

Figures 14A, 14B:
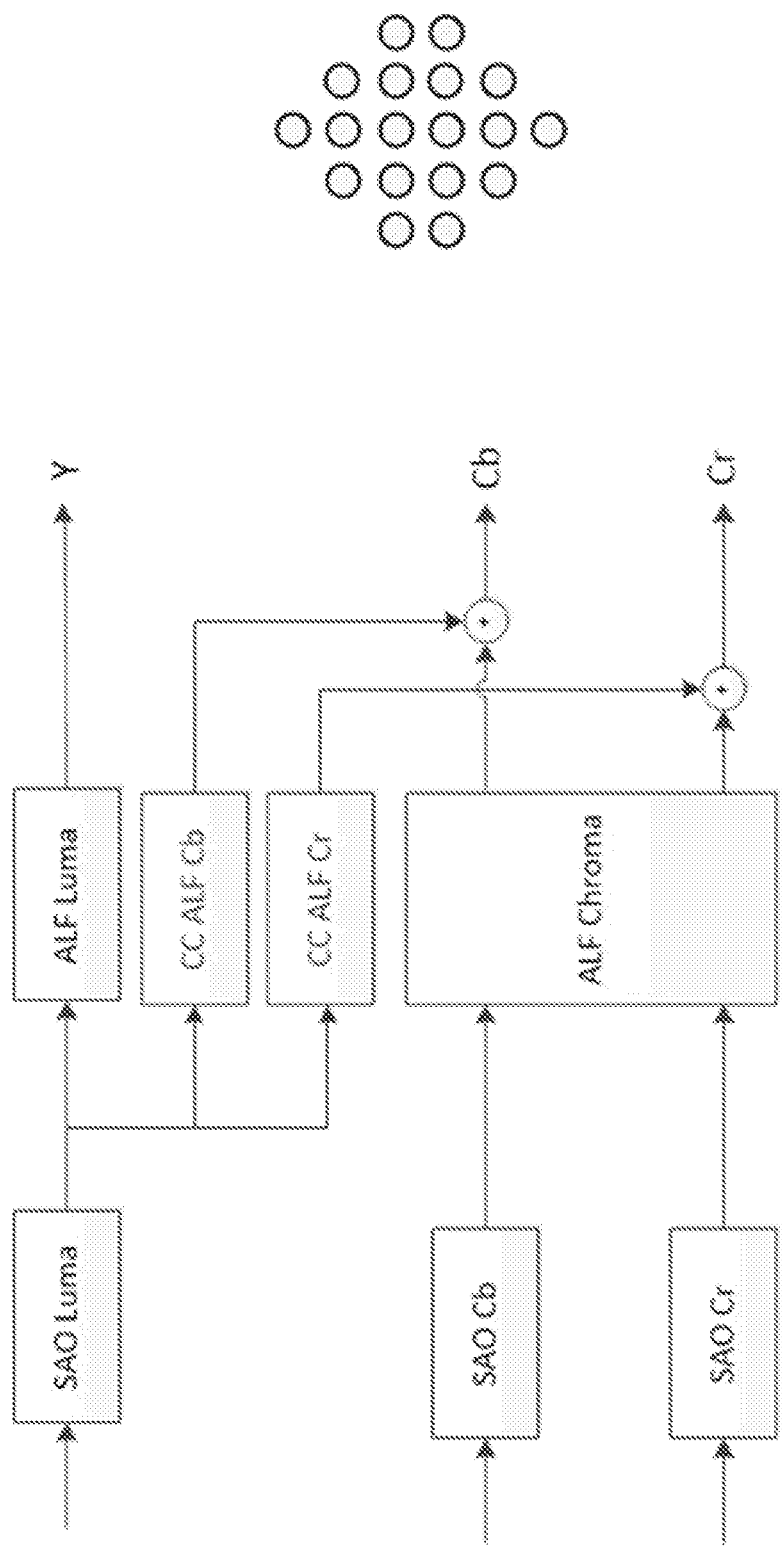
FIG. 14A illustrates an exemplary placement of a cross-component adaptive loop filter (CC-ALF) in accordance with an embodiment.
FIG. 14B shows an exemplary linear diamond shaped filter that is applied to the luma channel for each chroma component during the CC-ALF operation in accordance with an embodiment.

FIG. 14A illustrates an exemplary placement of the CC-ALF according to an embodiment of the disclosure. FIG. 14B shows an exemplary linear diamond shaped filter that is applied to the luma channel for each chroma component during the CC-ALF operation. The filter coefficients can be transmitted in the APS, for example scaled by a factor of $2^{10}$ and rounded for fixed point representation. The application of the filters is controlled on a variable block size and signaled by a context-coded flag received for each block of samples. The block size along with a CC-ALF enabling flag is received at the slice-level for each chroma component. In an example, the following block sizes (in chroma samples) are supported: 16×16, 32×32, and 64×64.

Table 3 shows syntax elements related to the CC-ALF.

TABLE 2

| bitDepth | clipIdx | | | |
|---|---|---|---|---|
| | 0 | 1 | 2 | 3 |
| 8 | 255 | 50 | 10 | 2 |
| 9 | 511 | 100 | 20 | 4 |
| 10 | 1023 | 201 | 39 | 8 |
| 11 | 2047 | 402 | 79 | 15 |
| 12 | 4095 | 803 | 158 | 31 |
| 13 | 8191 | 1607 | 315 | 62 |
| 14 | 16383 | 3214 | 630 | 124 |
| 15 | 32767 | 6427 | 1261 | 247 |
| 16 | 65535 | 12855 | 2521 | 495 |

In Table 3, the syntax element alf_ctb_cross_component_cb_idc[xCtb>>Ctb Log 2SizeY][yCtb>>Ctb Log 2SizeY] equal to 0 indicates that the cross component Cb filter is not applied to a block of samples in Cb color component at a luma location (xCtb, yCtb). The syntax element alf_ctb_cross_component_cb_idc[xCtb>>Ctb Log 2SizeY][yCtb>>Ctb Log 2SizeY] not equal to 0 indicates that the alf_ctb_cross_component_cb_idc[xCtb>>Ctb Log 2SizeY][yCtb>>Ctb Log 2SizeY]-th cross component Cb filter is applied to the block of samples in Cb color component at the luma location (xCtb, yCtb).

The syntax element alf_ctb_cross_component_cr_idc [xCtb>>Ctb Log 2SizeY][yCtb>>Ctb Log 2SizeY] equal to 0 indicates that the cross component Cr filter is not applied to a block of samples in Cr color component at the luma location (xCtb, yCtb). The syntax element alf_ctb_cross_component_cr_idc[xCtb>>Ctb Log 2SizeY] [yCtb>>Ctb Log 2SizeY] not equal to 0 indicates that the alf_ctb_cross_component_cr_idc[xCtb>>Ctb Log 2SizeY] [yCtb>>Ctb Log 2SizeY]-th cross component Cr filter is applied to the block of samples in Cr color component at the luma location (xCtb, yCtb).

IV. Chroma Sampling Formats

FIG. 15 shows exemplary relative positions of top-left chroma samples when chroma_format_idc is equal to 1 (4:2:0 chroma format), and chroma_sample_loc_type_top_field or chroma_sample_loc_type_bottom_field is equal to a value of a variable ChromaLocType. A region represented by a top-left 4:2:0 chroma sample is shown relative to a region represented by a top-left luma sample.

V. Constrained Directional Enhancement Filter

One goal of an in-loop constrained directional enhancement filter (CDEF) is to filter out coding artifacts while retaining details of an image. In some related examples such as HEVC, a sample adaptive offset (SAO) algorithm can achieve a similar goal by defining signal offsets for different classes of pixels. Unlike SAO, the CDEF is a non-linear spatial filter. The design of the filter has been constrained to be easily vectorizable, such as implementable with single instruction multiple data (SIMD) operations, which is not the case for other non-linear filters such as a median filter and a bilateral filter.

The CDEF design originates from the following observations. The amount of ringing artifacts in a coded image tends to be roughly proportional to a quantization step size. The amount of detail is a property of the input image, but the smallest detail retained in the quantized image tends to also be proportional to the quantization step size. For a given quantization step size, an amplitude of the ringing is generally less than amplitudes of the details.

The CDEF works by identifying a direction of each block and then adaptively filtering along the identified direction and to a lesser degree along directions rotated 45 degrees from the identified direction. Filter strengths are signaled explicitly, which allow a high degree of control over the blurring. An efficient encoder search is designed for the filter strengths. The CDEF is based on two previously proposed in-loop filters and the combined filter is adopted for the emerging AOMedia Video 1 (AV1) codec.

Figure 16:
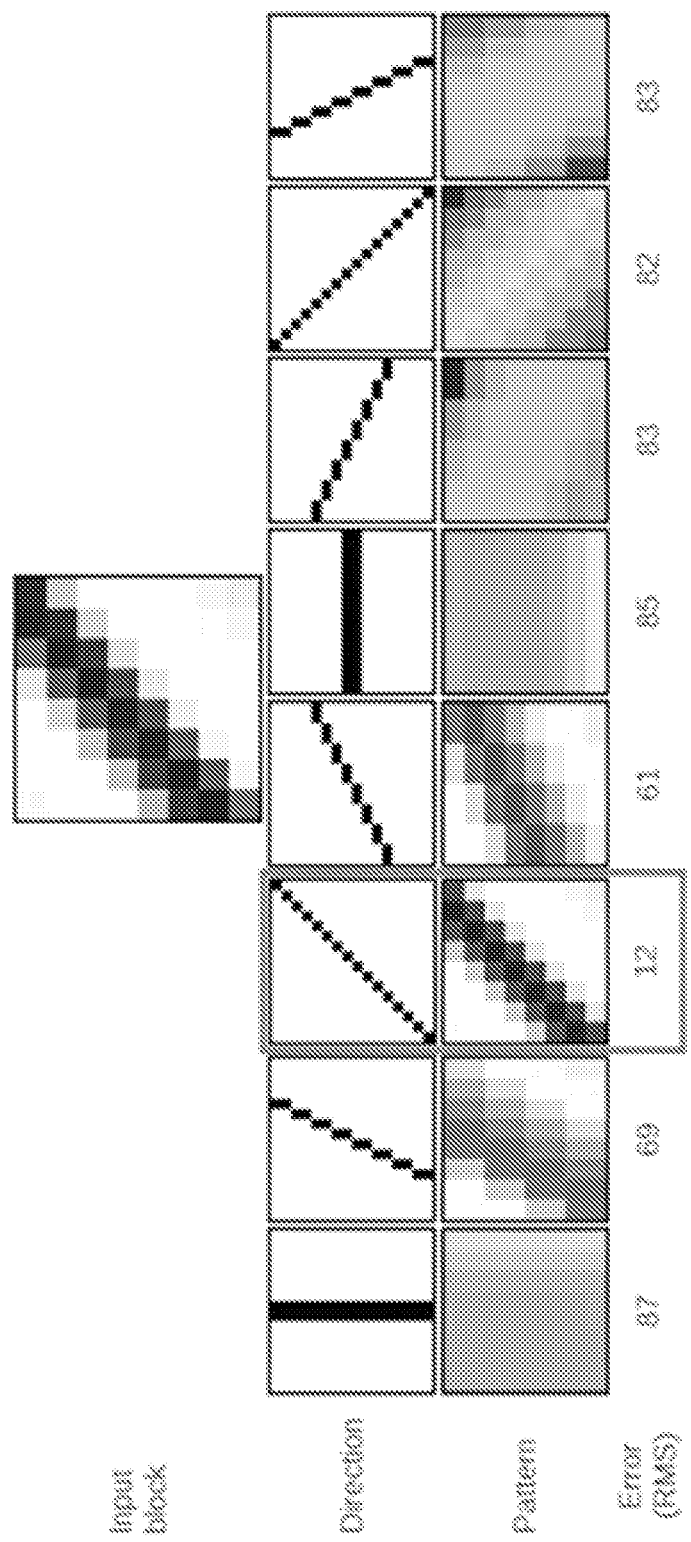
FIG. 16 shows an exemplary direction search for an 8×8 block in accordance with an embodiment.

FIG. 16 shows an exemplary direction search for an 8×8 block according to an embodiment of the disclosure. The direction search operates on the reconstructed pixels, just after a deblocking filter. Since those pixels are available to the decoder, the directions require no signaling. The search operates on 8×8 blocks, which are small enough to adequately handle non-straight edges, while being large enough to reliably estimate directions when being applied to a quantized image. Having a constant direction over an 8×8 region also makes vectorization of the filter easier. For each block, the direction that best matches the pattern in the respective block is determined by minimizing a sum of squared differences (SSD) between the quantized block and the closest perfectly directional block. A perfectly directional block is a block where all of the pixels along a line in one direction have the same value.

One reason for identifying the direction is to align the filter taps along that direction to reduce ringing while preserving the directional edges or patterns. However, directional filtering alone sometimes cannot sufficiently reduce ringing. It is also desired to use filter taps on pixels that do not lie along the main direction. To reduce the risk of blurring, these extra taps are treated more conservatively. For this reason, the CDEF defines primary taps and secondary taps. The complete 2-D CDEF filter is expressed as follows:

$$y(i,j)=x(i,j)+\text{round}(\Sigma_{m,n} w_{d,m,n}^{(p)} f(x(m,n)-x(i,j),S^{(p)},D)+\Sigma_{m,n} w_{d,m,n}^{(s)} f(x(m,n)-x(i,j),S^{(s)},D)) \quad \text{Eq. (16)}$$

where D is a damping parameter, $S^{(p)}$ and $S^{(s)}$ are the strengths of the primary and secondary taps, respectively, and round(•) rounds ties away from zero, $w_{d,m,n}^{(p)}$ and $w_{d,m,n}^{(s)}$ are filter weights and f(d, S, D) is a constraint function operating on a difference between the filtered pixel and each of the neighboring pixels. For a small difference, f(d, S, D)=d, making the filter behave like a linear filter. When the difference is large, f(d, S, D)=0, which effectively ignores the filter tap.

VI. Loop Restoration in AV1

A set of in-loop restoration schemes can be used in video coding post deblocking, to generally de-noise and enhance the quality of edges, beyond a traditional deblocking operation. These schemes are switchable within a frame per suitably sized tile. The specific schemes described are based on separable symmetric Wiener filters and dual self-guided filters with subspace projection. Because content statistics can vary substantially within a frame, these tools are integrated within a switchable framework where different tools can be triggered in different regions of the frame.

For a Wiener filter, every pixel in a degraded frame can be reconstructed as a non-causal filtered version of the respective pixel within a w×w window around the respective pixel, where w=2r+1 is odd for integer r. If the 2D filter taps are denoted by a W×1 element vector F in a column-vectorized form, a straightforward linear minimum mean square error (LMMSE) optimization leads to filter parameters being given by $F=H^{-1} M$, where $H=E[XX^T]$ is the autocovariance of x, the column-vectorized version of the $w^2$ samples in the w×w window around a pixel, and $M=E[YX^T]$ is the cross correlation of x with the scalar source sample y, to be estimated. The encoder can estimate H and M from realizations in the deblocked frame and the source, and send the resultant filter F to the decoder. However, this would not only incur a substantial bit rate cost in transmitting $w^2$ taps, but also a non-separable filtering making decoding prohibitively complex. Therefore, several additional constraints are imposed on the nature of F. First, F is constrained to be separable so that the filtering can be implemented as separable horizontal and vertical w-tap convolutions. Second, each of the horizontal and vertical filters is constrained to be symmetric. Third, a sum of both the horizontal and vertical filter coefficients is assumed to be 1.

For a guided filtering process, a local linear model can be expressed as follows:

$$y=Fx+G \qquad \text{Eq. (17)}$$

The local linear model is used to compute a filtered output y from an unfiltered sample x, where F and G are determined based on statistics of the degraded image and a guidance image in the neighborhood of the filtered pixel. If the guide image is the same as the degraded image, the resultant so-called self-guided filtering has an effect of edge preserving smoothing. A specific form of the self-guided filtering depends on two parameters: a radius r and a noise parameter e, and is enumerated as follows.

(1) Obtain mean $\mu$ and variance $\sigma^2$ of pixels in a (2r+1)× (2r+1) window around every pixel. This can be implemented efficiently with a box filtering based on integral imaging.
(2) Compute for every pixel: $f=\sigma^2/(\sigma^2+e)$; $g=(1-f)\mu$.
(3) Compute F and G for every pixel as averages of f and g values in a 3×3 window around the pixel for use.

Filtering is controlled by r and e, where a higher r implies a higher spatial variance and a higher e implies a higher range variance.

Figure 17:
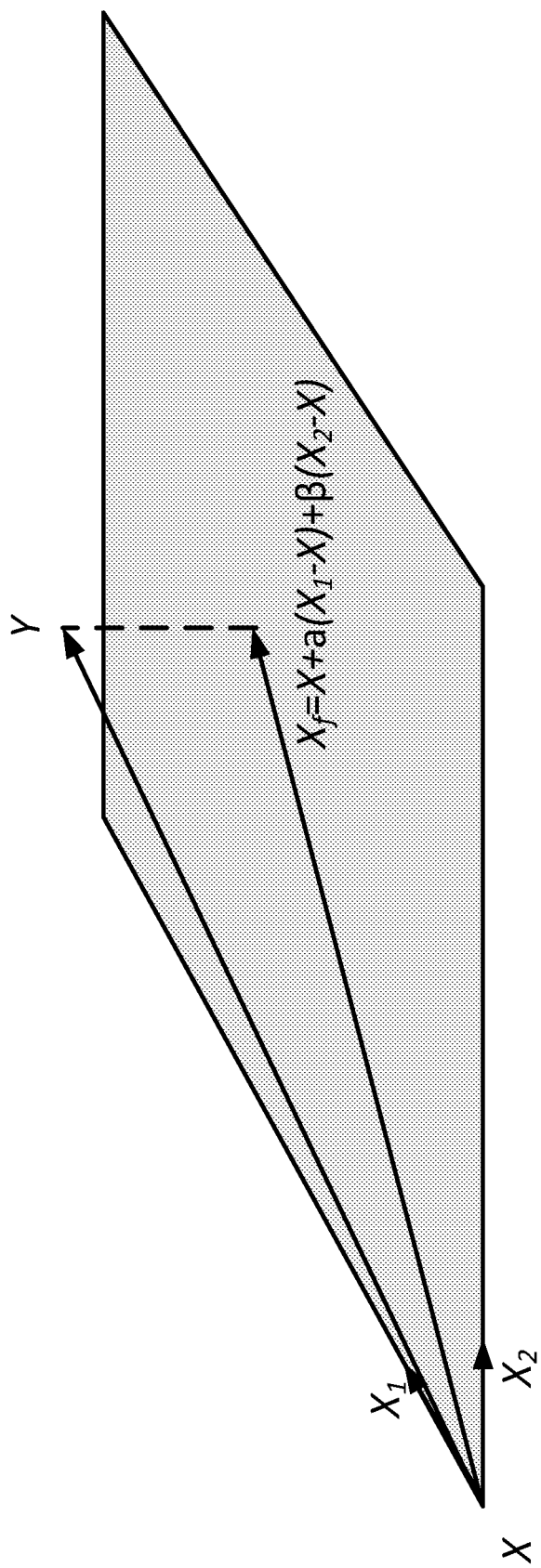
FIG. 17 shows an exemplary subspace projection in accordance with an embodiment.

FIG. 17 shows an exemplary subspace projection in accordance with an embodiment. Even though none of the cheap restorations $X_1$ and $X_2$ are close to the source Y, appropriate multipliers $\{\alpha, \beta\}$ can bring them much closer to the source as long as they are moving somewhat in the right direction. A cheap restoration may represent a restoration using computations with a relatively low complexity.

VII. Cross-Component Sample Offset Filter

A cross-component sample offset (CCSO) filter is a loop filtering approach to reduce distortion of reconstructed samples. In some embodiments, the reconstructed samples can be samples that are output from the aggregator (455). The reconstructed samples can be input into the loop filter (456). In the CCSO filter, given processed input reconstructed samples of a first color component, a non-linear mapping can be used to derive an output offset, and the output offset can be added on a reconstruction sample of a second color component in the filtering process of the CCSO filter. The input reconstructed samples of the first color component are located in a filter support area.

Figure 18:
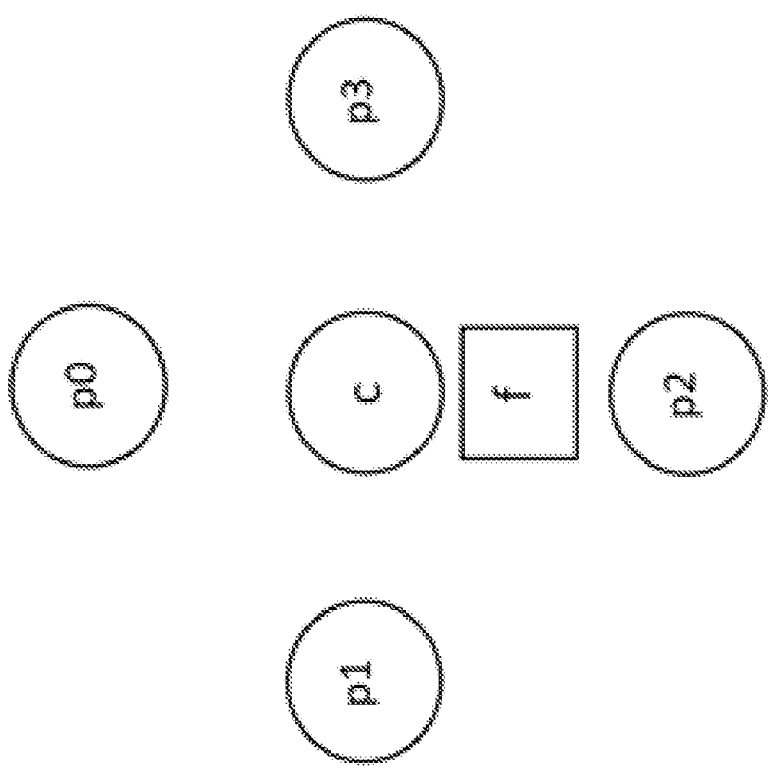
FIG. 18 shows an exemplary filter support area of a cross-component sample offset (CCSO) filter in accordance with an embodiment.

FIG. 18 shows an exemplary filter support area according to an embodiment of the disclosure. The filter support area includes four reconstructed samples: p0, p1, p2, and p3. The four input reconstructed samples follow a cross-shape in vertical and horizontal directions. A center sample (denoted by c) in the first color component and a sample to be filtered in the second color component are co-located. When processing the input reconstructed samples, following steps are applied:

Step 1: Delta values between p0-p3 and c are computed first, denoted as m0, m1, m2, and m3.
Step 2: The delta values m0-m3 are further quantized. The quantized values are denoted as d0, d1, d2, and d3. The quantized values can be −1, 0, and 1, based on the following quantization process: (a) d=−1, if m<−N; (b) d=0, if −N<=m<=N; and (c) d=1, if m>N, where N is referred to as a quantization step size, and example values of N include 4, 8, 12, and 16.

The quantized values d0-d3 can be used to identify one combination of non-linear mapping. For example, the CCSO filter in FIG. 8 has four filter taps d0-d3, and each filter tap can have one of the three quantized values (e.g., −1, 0, and 1), so there can be $3^4=81$ combinations in total.

FIGS. 19A-19B show a table tabulating 81 exemplary combinations of non-linear mappings in the CCSO filter in accordance with an embodiment. The last column of the table represents the output offset value for each combination. Example offset values are integers, such as 0, 1, −1, 3, −3, 5, −5, and −7.

The final filtering process of the CCSO filter can be applied as follows:

$$f'=\text{clip}(f+s) \qquad \text{Eq. (18)}$$

where f is a reconstructed sample to be filtered, and s is an output offset value retrieved from the table in FIGS. 19A-19B. A filtered sample value f' is further clipped into a range associated with a bit-depth.

VIII. Improved Cross-Component Sample Offset Filter

This disclosure includes methods of improving the performance of the CCSO filter, such as improved cross-component sample offset methods.

According to aspects of the disclosure, the non-linear mapping of the CCSO filter can include certain properties which allow a signaling overhead indicating the mapping relationship to be compressed. A reduced size of the mapping relationship can result in a smaller signaling overhead. Thus, improved coding efficiency can be achieved.

In this disclosure, the CCSO filter can be defined as a filtering process which uses reconstructed samples of a first color component as input (e.g., Y, Cb, or Cr), and applies an output on a second color component that is different from the first color component.

In the CCSO filter, the non-linear mapping can be derived at an encoder side. The non-linear mapping describes a relationship between input reconstructed samples of one color component and an offset to be added to the other color component. A domain of the non-linear mapping can be determined by different combinations of processed input reconstructed samples, such as input reconstructed samples on which linear processing has been performed.

According to aspects of the disclosure, the non-linear mapping of the CCSO filter can be compressed in order to reduce the signaling overhead without significantly affecting the performance of the CCSO filter with respect to a distortion reduction. As a result, the overall coding efficiency can be improved.

In some embodiments, the non-linear mapping can be used to derive an output offset given processed input reconstructed samples when the CCSO filter is applied. The overhead bits for signaling the non-linear mapping can be reduced. For example, instead of explicitly signaling each entry of the non-linear mapping, only a subset of the non-linear mapping can be signaled.

According to aspects of the disclosure, an output offset value for an input combination A can be excluded from being signaled. Instead, the output offset value for the input combination A can be derived from another input combination B. This derivation process can be referred to as mirroring derivation. One input combination refers to a combination of processed input reconstructed sample as described above (e.g., d0-d3).

In one embodiment, the output offset value for the input combination A can be derived as an opposite number (e.g., a number with a same absolute value and a different sign) of an output offset value for the input combination B, where A and B have opposite sign values for the input combination d0-d3. For example, if the output offset value for the input combination B (d0=a, d1=b, d2=c, d3=d) is s, then the output offset value for the input combination A (d0=−a, d1=−b, d2=−c, d3=−d) is −s.

In one embodiment, the output offset value for the input combination A can be derived as a same number of the output offset value for the input combination B, where A and B1 have opposite sign values for the processed input reconstructed samples d0-d3. For example, if the output offset value for the input combination B (d0=a, d1=b, d2=c, d3=d) is s, then the output offset value for the input combination A (d0=−a, d1=−b, d2=−c, d3=−d) is s.

In one embodiment, the output offset value for the input combination B can be signaled. The signaling can be provided in a high level syntax element such as an APS, a slice header, a frame header, a PPS, an SPS, a video parameter set (VPS), and the like.

According to aspects of the disclosure, a look-up table can be used to describe the compressed non-linear mapping. Each row of the look-up table corresponds to an input combination d0-d3 and an associated output offset value. In some embodiments, a part of the table shown in FIGS. 19A-19B can be used to describe compressed non-linear mapping. In an embodiment, output offset values of the first 41 rows of the table shown in FIG. 19A can be signaled, and output offset values of the remaining 40 rows can be derived based on the signaled output offset values of the first 41 rows. FIG. 19C shows an example where an output offset value in the Nth row of the remaining 40 rows can be derived as a same number of an output offset value in the (80-N)th row, which is signaled in the first 41 rows. For example, as shown in FIG. 19C, an output offset value in the 41th row is s39 which is an output offset value in the 39th row in FIG. 19A. FIG. 19D shows another example where the output offset value in the Nth row of the remaining 40 rows can be derived as an opposite number of the output offset value in the (80-N)th row, which is signaled in the first 41 rows. For example, as shown in FIG. 19D, the output offset value in the 41th row is −s39 which is an opposite number of the output offset value in the 39th row in FIG. 19A.

In one embodiment, a parameter indicating an enabling of the mirroring derivation can be signaled. The signaling can be provided in a high level syntax element such as an APS, a slice header, a frame header, a PPS, an SPS, a VPS, and the like.

According to aspects of the disclosure, only a subset of the non-linear mapping is signaled. For an input combination that is not signaled, an output offset value can be derived as a default value. Examples of the default value are integers, such as 0, 1, −1, 3, −3, 5, −5, and −7.

In some embodiments, different subsets can be used and the signaled subset can be switched among the different subsets. A selection of the signaled subset of the non-linear mapping can be signaled, for example in a block level or a high level syntax element such as an APS, a slice header, a frame header, a PPS, an SPS, a VPS, and the like. In one example, two subsets that have 16 and 81 combinations of the non-linear mapping in the table shown in FIGS. 19A-19B are supported, and the selection is signaled as a flag. In another example, two subsets that have 17 and 81 combinations of the non-linear mapping in the table shown in FIGS. 19A-19B are supported, and the selection is signaled as a flag. In another example, two subsets that have 33 and 81 combinations of the non-linear mapping in the table shown in FIGS. 19A-19B are supported, and the selection is signaled as a flag. In another example, three subsets that have 16, 32, and 81 combinations of the non-linear mapping in the table shown in FIGS. 19A-19B are supported, and the selection is signaled by an index. In another example, three subsets that have 17, 33, and 81 combinations of the non-linear mapping in the table shown in FIGS. 19A-19B are supported, and the selection is signaled by an index. In another example, five subsets that have 16, 17, 32, 33, and 81 combinations of the non-linear mapping in the table shown in FIGS. 19A-19B are supported, and the selection is signaled by an index.

FIG. 19E shows an example where only 17 combinations of the non-linear mapping in the table shown in FIGS. 19A-19B are signaled and the output offset values for the remaining combinations can be derived as a default value (e.g., 0).

FIG. 19F shows an example where only 16 combinations of the non-linear mapping in the table shown in FIGS. 19A-19B are signaled, and the output offset values for the remaining combinations can be derived as a default value (e.g., 0).

FIG. 19G shows an example where only 33 combinations of the non-linear mapping in the table shown in FIGS. 19A-19B are signaled, and the output offset values for the remaining combinations can be derived as a default value (e.g., 0).

FIG. 19H shows an example where only 32 combinations of the non-linear mapping in the table shown in FIGS. 19A-19B are signaled, and the output offset values for the rest combinations can be derived as a default value (e.g., 0).

According to aspects of the disclosure, the non-linear mapping can be divided into multiple subsets such as three subsets A, B, and C, in which only the subset B is signaled. An output offset value for an input combination in the subset A can be derived from the subset B. An output offset value for an input combination in the subset C can be derived as default value. Examples of the default value are integers, such as 0, 1, −1, 3, −3, 5, −5, and −7.

In one embodiment, an output offset value for an input combination A1 in the subset A can be derived as an opposite number of an output offset value for an input combination B1 in the subset B, where A1 and B1 have opposite sign values for the input combination d0-d3. An output offset value for an input combination in the subset C can be derived as a default value (e.g., 0). For example, if the output offset value for the input combination B1 (d0=a, d1=b, d2=c, d3=d) in the subset B is s, then the output offset value for the input combination A1 (d0=−a, d1=−b, d2=−c, d3=−d) in the subset A is −s.

In one embodiment, the output offset value for the input combination A1 in the subset A can be derived as a same number of the output offset value for the input combination B1 in the subset B, where A1 and B1 have opposite sign values for the input combination d0-d3. An output offset value for an input combination in the subset C can be derived as a default value (e.g., 0). For example, if the output offset value for the input combination B1 (d0=a, d1=b, d2=c, d3=d) in the subset B is s, then the output offset value for the input combination A1 (d0=−a, d1=−b, d2=−c, d3=−d) in the subset A is s.

In one embodiment, a parameter indicating an enabling of the mirroring derivation of a subset of the non-linear mapping can be signaled. The signaling can be provided in a high level syntax element such as an APS, a slice header, a frame header, a PPS, an SPS, a VPS, and the like.

According to aspects of the disclosure, only a limited set of selected output offset values are supported in the non-linear mapping.

In one embodiment, a range of the supported output offset values can cover [−4, +3], [−8, +7], [−16, +15], [$-2^K$, $2^K$], [K, L], pre-defined integers, 0 and odd integers, and 0 and even integers, where K and L are integers.

In one example, a set of supported output offset values can include 0 and a set of odd integers with different sign values, such as 0, 1, −1, 3, −3, 5, −5, and −7. In another example, the set of supported output offset values can include 0 and a set of even integers with different sign values, such as 0, 2, −2, 4, −4, 6, −6, and −8.

In one embodiment, a set of supported output offset values can be signaled. The signaling can be provided in a high level syntax element such as an APS, a slice header, a frame header, a PPS, an SPS, a VPS, and the like.

In one embodiment, an array of offset values can be supported in the non-linear mapping and an index can be signaled. The signaling can be provided in a high level syntax element such as an APS, a slice header, a frame header, a PPS, an SPS, a VPS, and the like, to indicate an output offset value in the array that is selected for an input combination.

In one embodiment, different input combinations can have different sets of supported output offset values.

In one embodiment, a set of supported offset values can depend on a quantization parameter.

In one embodiment, an output offset value or an index of an output offset value can be signaled using a fixed length coding.

According to aspects of the disclosure, an output offset value for an input combination that is applied to a current coding block in a current slice of a current picture can be predicted from an output offset value applied to a different picture, a different slice, or a different coding block.

In one embodiment, instead of signaling the output offset value, a delta value between the output offset value and a predicted output offset value can be signaled.

In one embodiment, the output offset value for at least one input combination is not signaled and can be derived from the predicted output offset value.

In one embodiment, whether the output offset value is predicted can be signaled through a flag. The flag can be provided in a high level syntax element such as an APS, a slice header, a frame header, a PPS, an SPS, a VPS, and the like.

The prediction of the output offset value can depend on coded information, including but not being limited to a frame type, a temporal layer, and a quantization parameter.

In some related examples, one or more filtering processes can be applied to reconstructed samples of a coded block. For example, a deblocking module can be applied to the reconstructed samples of the coded block. Then, a CDEF module can be applied to filtered reconstructed samples that are output from the deblocking module, and a loop restoration filter module can be applied to filtered reconstructed samples that are output from the CDEF module.

According to aspects of the disclosure, when a CCSO filter is applied to reconstructed samples of a coded block, input and output locations of the CCSO filter are flexible. The input location of the CCSO filter is where the input reconstructed samples of the CCSO filter are selected. The output location of the CCSO filter is where the output offset value of the CCSO filter is applied (e.g., the CCSO filtering is applied).

In some embodiments, the input and output can share a same location. That is, there is no other coding module placed between the input and output locations of the CCSO filter. In one example, both the input and output locations can be right before a deblocking module. In another example, both the input and output locations can be after the deblocking module and before a CDEF module. In another example, both the input and output locations can be after the CDEF module and before a loop restoration filter (LR) module. In another example, both the input and output locations can be after the LR module.

In some embodiments, the input and output locations can be different, and the input location is ahead of the output location. That is, there is at least one coding module placed between the input and output locations of the CCSO filter. In one example, the input location can be right before the deblocking module, and the output location can be after the deblocking module and before the CDEF module. In another example, the input location can be after the deblocking module and before the CDEF module, and the output location can be after the CDEF module and before the LR module. In another example, the input location can be after the CDEF module and before the LR module, and the output location can be after the LR module.

In one embodiment, the CDEF and LR modules in the above embodiments can be replaced by an SAO module and an ALF module, respectively. The same method in the above embodiments can be applied to this embodiment.

IX. Flowchart

Figure 20:
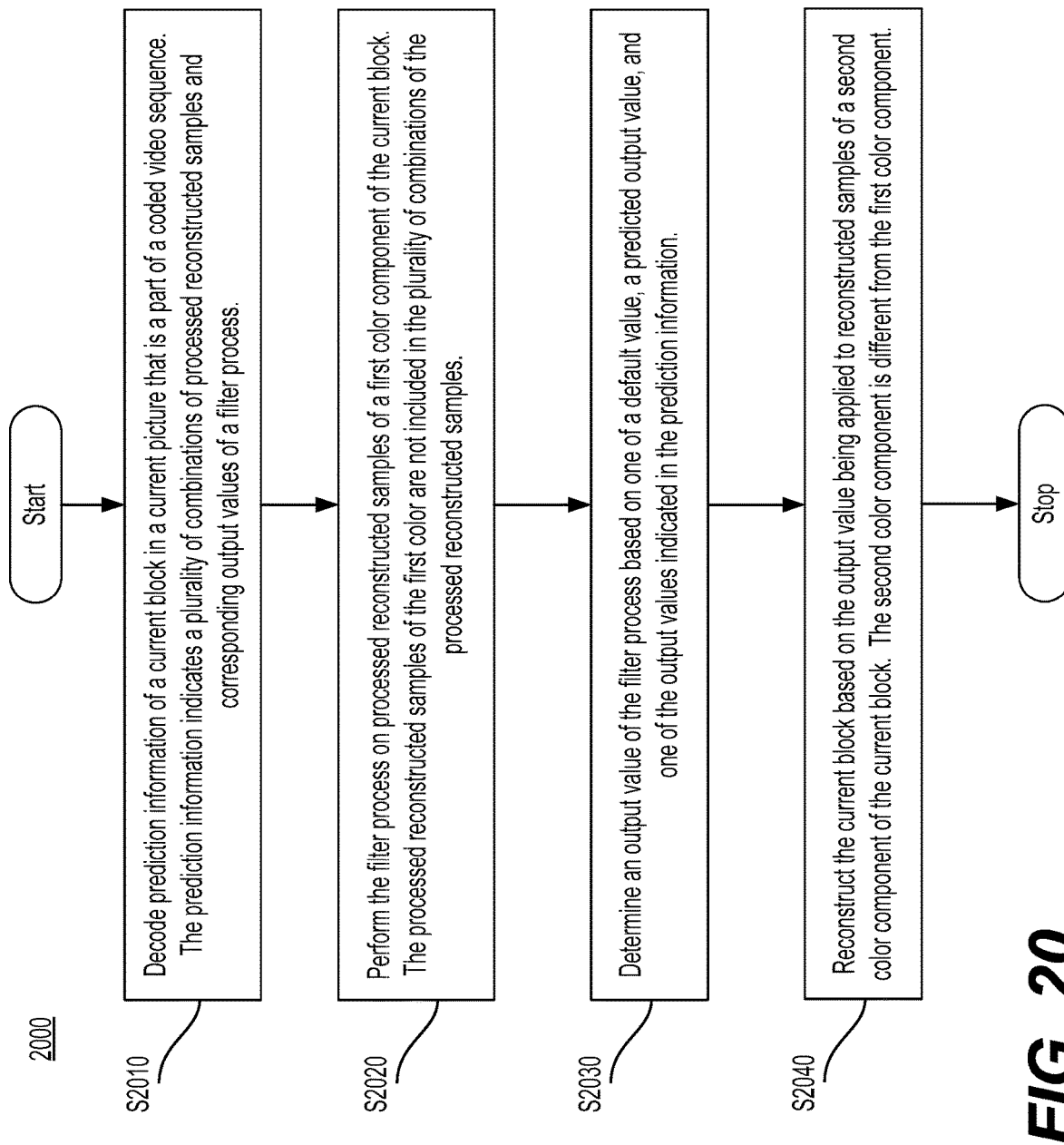
FIG. 20 shows an exemplary flowchart in accordance with an embodiment.

FIG. 20 shows a flow chart outlining an exemplary process (2000) according to an embodiment of the disclosure. In various embodiments, the process (2000) is executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the intra prediction module (452), the processing circuitry that performs functions of the video encoder (503), the processing circuitry that performs functions of the predictor (535), the processing circuitry that performs functions of the intra encoder (622), the processing circuitry that performs functions of the intra decoder (772), and the like. In some embodiments, the process (2000) is implemented in software instructions, thus when the processing circuitry executes the software instructions, the processing circuitry performs the process (2000).

The process (2000) may generally start at step (S2010), where the process (2000) decodes prediction information of a current block in a current picture that is a part of a coded video sequence. The prediction information indicates a plurality of combinations of processed reconstructed samples and corresponding output values of a filter process. The filter process can be used to reduce compression artifacts and distortions of the reconstructed samples. The filter process can use processed reconstructed samples of a first color component as input (e.g., Y, Cb, or Cr), and apply an output on a second color component that is different from the first color component. In some embodiments, the filter process can be performed in the loop filter unit (456). Examples of the filter process include but are not limited to CCSO and CC-ALF. Then, the process (2000) proceeds to step (S2020).

At step (S2020), the process (2000) performs the filter process on processed reconstructed samples of a first color component of the current block. The processed reconstructed samples of the first color are not included in the plurality of combinations of the processed reconstructed samples. Then, the process (2000) proceeds to step (S2030).

At step (S2030), the process (2000) determines an output value of the filter process based on one of a default value, a predicted output value, and one of the output values indicated in the prediction information. Then, the process (2000) proceeds to step (S2040).

At step (S2040), the process (2000) reconstructs the current block based on the output value being applied to reconstructed samples of a second color component of the current block. The second color component is different from the first color component. Then, the process (2000) terminates.

In one embodiment, the process (2000) determines one of a first value and a second value as the output value of the filter process. The first value is the one of the output values indicated in the prediction information, and the second value is an opposite number of the first value.

In one embodiment, each of the processed reconstructed samples of the first color component is an opposite number of a corresponding processed reconstructed sample in one of the plurality of combinations of processed reconstructed samples indicated in the prediction information, and the one of the output values indicated in the prediction information corresponds to the one of the plurality of combinations of processed reconstructed samples indicated in the prediction information.

In one embodiment, a sum of an index of the processed reconstructed samples of the first color component in a mapping table of the filter process and an index of the one of the output values indicated in the prediction information in the mapping table of the filter process is equal to a maximum index of the mapping table.

In one embodiment, the process (2000) determines the default value as the output value of the filter process based on the prediction information indicating that the plurality of combinations of processed reconstructed samples indicated in the prediction information is a subset of a total number of combinations of processed reconstructed samples in the filter process.

In one embodiment, the predicted output value is determined based on an output value of the filter processing applied to another coding block.

In one embodiment, the processed reconstructed samples of the first color component are determined based on reconstructed samples of the first color component that are output from a first coding module, and the reconstructed samples of the second color component are output from the first coding module or a second coding module that is applied after the first coding module.

X. Computer System

The techniques described above, can be implemented as computer software using computer-readable instructions and physically stored in one or more computer-readable media. For example, FIG. 21 shows a computer system (2100) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 21:
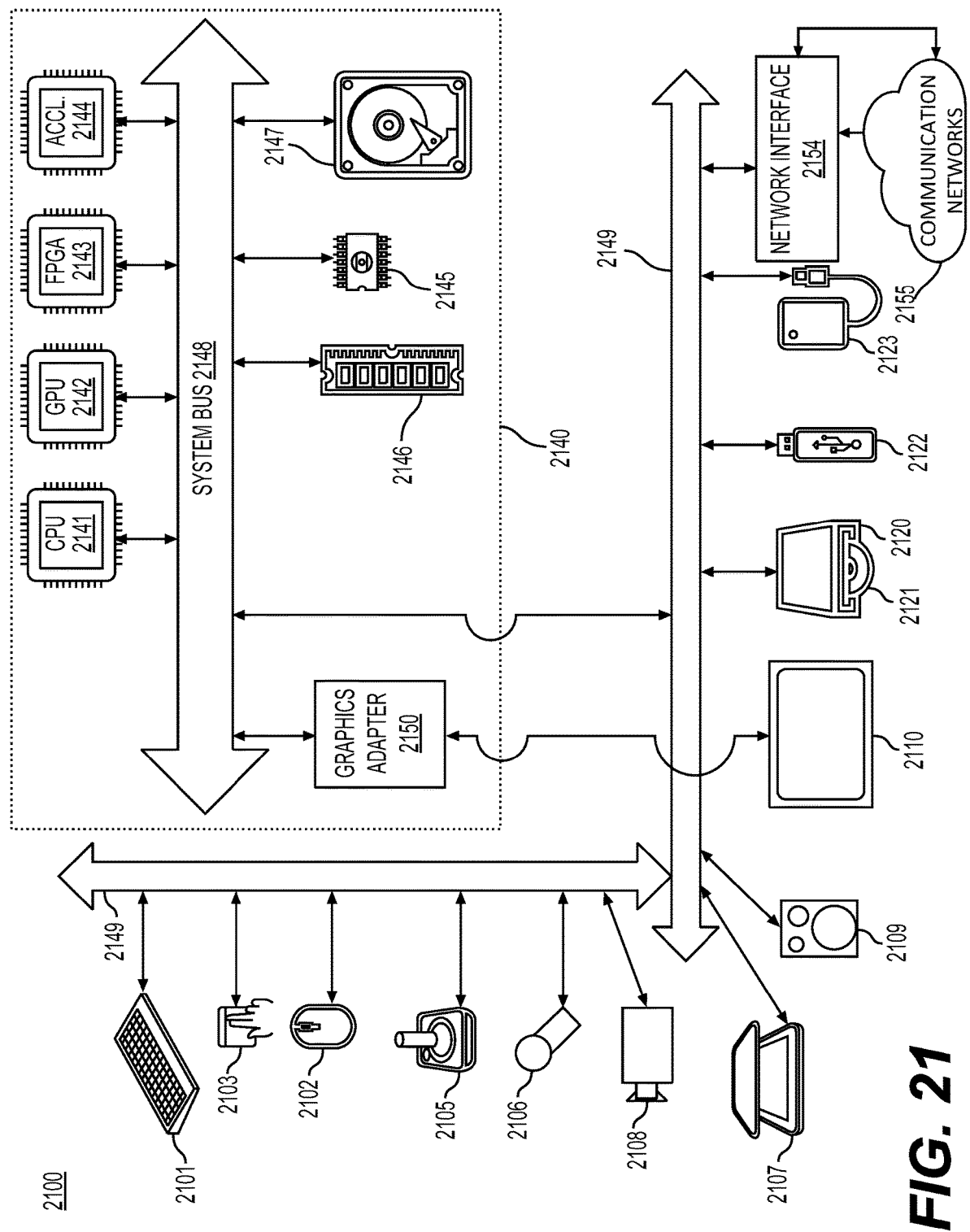
FIG. 21 is a schematic illustration of a computer system in accordance with an embodiment.

The components shown in FIG. 21 for computer system (2100) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2100).

Computer system (2100) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2101), mouse (2102), trackpad (2103), touch screen (2110), data-glove (not shown), joystick (2105), microphone (2106), scanner (2107), and camera (2108).

Computer system (2100) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2110), data-glove (not shown), or joystick (2105), but there can also be tactile feedback devices that do not serve as input devices), audio output devices (such as: speakers (2109), headphones (not depicted)), visual output devices (such as screens (2110) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted). These visual output devices (such as screens (2110)) can be connected to a system bus (2148) through a graphics adapter (2150).

Computer system (2100) can also include human accessible storage devices and their associated media such as optical media including CD/DVD ROM/RW (2120) with CD/DVD or the like media (2121), thumb-drive (2122), removable hard drive or solid state drive (2123), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2100) can also include a network interface (2154) to one or more communication networks (2155). The one or more communication networks (2155) can for example be wireless, wireline, optical. The one or more communication networks (2155) can further be local, wide-area, metropolitan, vehicular and industrial, real-time, delay-tolerant, and so on. Examples of the one or more communication networks (2155) include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2149) (such as, for example USB ports of the computer system (2100)); others are commonly integrated into the core of the computer system (2100) by attachment to a system bus as described below (for example Ethernet interface into a PC computer system or cellular network interface into a smartphone computer system). Using any of these networks, computer system (2100) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2140) of the computer system (2100).

The core (2140) can include one or more Central Processing Units (CPU) (2141), Graphics Processing Units (GPU) (2142), specialized programmable processing units in the form of Field Programmable Gate Areas (FPGA) (2143), hardware accelerators for certain tasks (2144), graphics adapters (2150), and so forth. These devices, along with Read-only memory (ROM) (2145), Random-access memory (2146), internal mass storage (2147) such as internal non-user accessible hard drives, SSDs, and the like, may be connected through the system bus (2148). In some computer systems, the system bus (2148) can be accessible in the form of one or more physical plugs to enable extensions by additional CPUs, GPU, and the like. The peripheral devices can be attached either directly to the core's system bus (2148), or through a peripheral bus (2149). In an example, the screen (2110) can be connected to the graphics adapter (2150). Architectures for a peripheral bus include PCI, USB, and the like.

CPUs (2141), GPUs (2142), FPGAs (2143), and accelerators (2144) can execute certain instructions that, in combination, can make up the aforementioned computer code. That computer code can be stored in ROM (2145) or RAM (2146). Transitional data can be also be stored in RAM (2146), whereas permanent data can be stored for example, in the internal mass storage (2147). Fast storage and retrieve to any of the memory devices can be enabled through the use of cache memory, that can be closely associated with one or more CPU (2141), GPU (2142), mass storage (2147), ROM (2145), RAM (2146), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2100), and specifically the core (2140) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2140) that are of non-transitory nature, such as core-internal mass storage (2147) or ROM (2145). The software implementing various embodiments of the present disclosure can be stored in such devices and executed by core (2140). A computer-readable medium can include one or more memory devices or chips, according to particular needs. The software can cause the core (2140) and specifically the processors therein (including CPU, GPU, FPGA, and the like) to execute particular processes or particular parts of particular processes described herein, including defining data structures stored in RAM (2146) and modifying such data structures according to the processes defined by the software. In addition or as an alternative, the computer system can provide functionality as a result of logic hardwired or otherwise embodied in a circuit (for example: accelerator (2144)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

APPENDIX A: ACRONYMS

ALF: Adaptive Loop Filter
AMVP: Advanced Motion Vector Prediction
APS: Adaptation Parameter Set
ASIC: Application-Specific Integrated Circuit
ATMVP: Alternative/Advanced Temporal Motion Vector Prediction
AV1: AOMedia Video 1
AV2: AOMedia Video 2
BMS: Benchmark Set
BV: Block Vector
CANBus: Controller Area Network Bus
CB: Coding Block
CC-ALF: Cross-Component Adaptive Loop Filter
CD: Compact Disc
CDEF: Constrained Directional Enhancement Filter
CPR: Current Picture Referencing
CPU: Central Processing Unit CRT: Cathode Ray Tube
CTB: Coding Tree Block
CTU: Coding Tree Unit
CU: Coding Unit
DPB: Decoder Picture Buffer
DPCM: Differential Pulse-Code Modulation
DPS: Decoding Parameter Set
DVD: Digital Video Disc
FPGA: Field Programmable Gate Area
JCCR: Joint CbCr Residual Coding
JVET: Joint Video Exploration Team
GOP: Groups of Pictures
GPU: Graphics Processing Unit
GSM: Global System for Mobile communications
HDR: High Dynamic Range
HEVC: High Efficiency Video Coding
HRD: Hypothetical Reference Decoder
IBC: Intra Block Copy
IC: Integrated Circuit
ISP: Intra Sub-Partitions
JEM: Joint Exploration Model
LAN: Local Area Network
LCD: Liquid-Crystal Display
LR: Loop Restoration Filter
LRU: Loop Restoration Unit
LTE: Long-Term Evolution
MPM: Most Probable Mode
MV: Motion Vector
OLED: Organic Light-Emitting Diode
PBs: Prediction Blocks
PCI: Peripheral Component Interconnect
PDPC: Position Dependent Prediction Combination
PLD: Programmable Logic Device
PPS: Picture Parameter Set
PU: Prediction Unit
RAM: Random Access Memory
ROM: Read-Only Memory
SAO: Sample Adaptive Offset
SCC: Screen Content Coding
SDR: Standard Dynamic Range
SEI: Supplementary Enhancement Information
SNR: Signal Noise Ratio
SPS: Sequence Parameter Set
SSD: Solid-state Drive
TU: Transform Unit
USB: Universal Serial Bus
VPS: Video Parameter Set
VUI: Video Usability Information
VVC: Versatile Video Coding
WAIP: Wide-Angle Intra Prediction

What is claimed is:

1. A method of video decoding, comprising:
decoding prediction information of a current block in a current picture of a coded video sequence, the prediction information indicating a subset of combinations of processed reconstructed samples of a first color component of a coding block and corresponding offset values of a filter process to be applied to a second color component of the coding block;
determining an offset value of the filter process to apply to a reconstructed sample of the second color component of the current block based on a combination of processed reconstructed samples of the first color component of the current block; and
reconstructing the current block based on the determined offset value applied to the reconstructed sample of the second color component of the current block, the second color component being different from the first color component, wherein
when the combination of the processed reconstructed samples of the first color component of the current block is a first combination of the subset of the combinations of the processed reconstructed samples, the determined offset value is the offset value corresponding to the first combination of the processed reconstructed samples indicated by the prediction information, and
when the combination of the processed reconstructed samples of the first color component of the current block is different from each of the subset of the combinations of the processed reconstructed samples, the determined offset value is derived from the offset value of the filter process corresponding to a second combination of the subset of the combinations of the processed reconstructed samples.

2. The method of claim 1, wherein
the combination of the processed reconstructed samples of the first color component of the current block is different from each of the subset of the combinations of the processed reconstructed samples, and
the determined offset value is not indicated by the prediction information.

3. The method of claim 1, wherein
the combination of the processed reconstructed samples of the first color component of the current block is different from each of the subset of the combinations of the processed reconstructed samples, and
the determined offset value is based on a predicted offset value of the filter process applied to another coding block.

4. The method of claim 1, wherein
the combination of the processed reconstructed samples of the first color component of the current block is different from each of the subset of the combinations of the processed reconstructed samples, and
the determined offset value is derived from the offset value of the filter process corresponding to the second combination of the processed reconstructed samples indicated in the prediction information.

5. The method of claim 4, wherein the determined offset value of the filter process is equal to the offset value of the filter process corresponding to the second combination of the processed reconstructed samples.

6. The method of claim 4, wherein the determined offset value of the filter process and the offset value of the filter process corresponding to the second combination of the processed reconstructed samples have different sign values.

7. The method of claim 4, wherein
the combination of the processed reconstructed samples of the first color component of the current block is different from each of the subset of the combinations of the processed reconstructed samples, and
the determined offset value of the filter process is based on (i) the offset value of the filter process corresponding to the second combination of the processed reconstructed samples indicated in the prediction information and (ii) a syntax element that indicates whether the determined offset value of the filter process and the offset value of the filter process corresponding to the second combination of the processed reconstructed samples have a same sign.

8. The method of claim 1, wherein the prediction information includes a syntax element that indicates which of a plurality of subsets of the processed reconstructed samples is indicated by the prediction information.

9. A method of video encoding, comprising:
  determining an offset value of a filter process to apply to a reconstructed sample of a second color component of a current block based on a combination of processed reconstructed samples of a first color component of the current block;
  encoding the current block in a bitstream based on the determined offset value applied to the reconstructed sample of the second color component of the current block, the second color component being different from the first color component; and
  encoding prediction information in the bitstream, the prediction information indicating a subset of combinations of processed reconstructed samples of the first color component of a coding block and corresponding offset values of the filter process to be applied to the second color component of the coding block, wherein
  when the combination of the processed reconstructed samples of the first color component of the current block is a first combination of the subset of the combinations of the processed reconstructed samples, the determined offset value is the offset value corresponding to the first combination of the processed reconstructed samples indicated by the prediction information, and
  when the combination of the processed reconstructed samples of the first color component of the current block is different from each of the subset of the combinations of the processed reconstructed samples, the determined offset value is derived from the offset value of the filter process corresponding to a second combination of the subset of the combinations of the processed reconstructed samples.

10. The method of claim 9, wherein
  the combination of the processed reconstructed samples of the first color component of the current block is different from each of the subset of the combinations of the processed reconstructed samples, and
  the determined offset value is not indicated by the prediction information.

11. The method of claim 9, wherein
  the combination of the processed reconstructed samples of the first color component of the current block is different from each of the subset of the combinations of the processed reconstructed samples, and
  the determined offset value is based on a predicted offset value of the filter process applied to another coding block.

12. The method of claim 9, wherein
  the combination of the processed reconstructed samples of the first color component of the current block is different from each of the subset of the combinations of the processed reconstructed samples, and
  the determined offset value is derived from the offset value of the filter process corresponding to the second combination of the processed reconstructed samples indicated in the prediction information.

13. The method of claim 12, wherein the determined offset value of the filter process is equal to the offset value of the filter process corresponding to the second combination of the processed reconstructed samples.

14. The method of claim 12, wherein the determined offset value of the filter process and the offset value of the filter process corresponding to the second combination of the processed reconstructed samples have different sign values.

15. The method of claim 12, wherein
  the combination of the processed reconstructed samples of the first color component of the current block is different from each of the subset of the combinations of the processed reconstructed samples, and
  the determined offset value of the filter process is based on (i) the offset value of the filter process corresponding to the second combination of the processed reconstructed samples indicated in the prediction information and (ii) a syntax element that indicates whether the determined offset value of the filter process and the offset value of the filter process corresponding to the second combination of the processed reconstructed samples have a same sign.

16. The method of claim 9, wherein the prediction information includes a syntax element that indicates which of a plurality of subsets of the processed reconstructed samples is indicated by the prediction information.

17. A method of bitstream conversion, the method comprising:
  performing a conversion between a visual media file and a bitstream of visual media data according to a format rule, wherein
  the bitstream includes prediction information indicating a subset of combinations of processed reconstructed samples of a first color component of a coding block and corresponding offset values of a filter process to be applied to a second color component of the coding block; and
  the format rule specifies that
    a determined offset value of the filter process to apply to a reconstructed sample of the second color component of a current block in a current picture is determined based on a combination of processed reconstructed samples of the first color component of the current block,
    the current block is reconstructed based on the determined offset value applied to the reconstructed sample of the second color component of the current block, the second color component being different from the first color component,
    when the combination of the processed reconstructed samples of the first color component of the current block is a first combination of the subset of the combinations of the processed reconstructed samples, the determined offset value is a offset value corresponding to the first combination of the processed reconstructed samples indicated by the prediction information, and
    when the combination of the processed reconstructed samples of the first color component of the current block is different from each of the subset of the combinations of the processed reconstructed samples, the determined offset value is derived from an offset value of the filter process corresponding to a second combination of the subset of the combinations of the processed reconstructed samples.

18. The method of claim 17, wherein
  the combination of the processed reconstructed samples of the first color component of the current block is different from each of the subset of the combinations of the processed reconstructed samples, and
  the determined offset value is not indicated by the prediction information.

19. The method of claim 17, wherein
the combination of the processed reconstructed samples of the first color component of the current block is different from each of the subset of the combinations of the processed reconstructed samples, and
the determined offset value is based on a predicted offset value of the filter process applied to another coding block.

20. The method of claim 17, wherein
the combination of the processed reconstructed samples of the first color component of the current block is different from each of the subset of the combinations of the processed reconstructed samples, and
the determined offset value is derived from the offset value of the filter process corresponding to the second combination of the processed reconstructed samples indicated in the prediction information.

21. The method of claim 20, wherein the determined offset value of the filter process is equal to the offset value of the filter process corresponding to the second combination of the processed reconstructed samples.

\* \* \* \* \*